(12) United States Patent
Gao et al.

(10) Patent No.: US 12,549,292 B2
(45) Date of Patent: Feb. 10, 2026

(54) HARQ CODEBOOKS FOR MULTIPLE DL SPS

(71) Applicant: Telefonaktiebolaget LM Ericsson (publ), Stockholm (SE)

(72) Inventors: Shiwei Gao, Nepean (CA); Yufei Blankenship, Kildeer, IL (US); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 862 days.

(21) Appl. No.: 17/634,575

(22) PCT Filed: Aug. 14, 2020

(86) PCT No.: PCT/IB2020/057700
§ 371 (c)(1),
(2) Date: Feb. 11, 2022

(87) PCT Pub. No.: WO2021/033116
PCT Pub. Date: Feb. 25, 2021

(65) Prior Publication Data
US 2022/0271873 A1 Aug. 25, 2022

Related U.S. Application Data

(60) Provisional application No. 62/888,095, filed on Aug. 16, 2019.

(51) Int. Cl.
*H04L 1/1829* (2023.01)
*H04L 1/1867* (2023.01)

(52) U.S. Cl.
CPC .......... *H04L 1/1854* (2013.01); *H04L 1/1861* (2013.01); *H04L 1/1887* (2013.01); *H04L 1/1896* (2013.01)

(58) Field of Classification Search
None
See application file for complete search history.

(56) References Cited

U.S. PATENT DOCUMENTS

2016/0226630 A1* 8/2016 Zhang ................. H04L 1/1864
2018/0278373 A1* 9/2018 Wang .................. H04L 5/0055
(Continued)

FOREIGN PATENT DOCUMENTS

CN 107534527 A 1/2018
CN 108964846 A 12/2018
(Continued)

OTHER PUBLICATIONS

First Office Action for Chinese Patent Application No. 202080058046.2, mailed Nov. 28, 2023, 15 pages.
(Continued)

*Primary Examiner* — Otis L Thompson, Jr.
(74) *Attorney, Agent, or Firm* — Withrow & Terranova, PLLC

(57) ABSTRACT

Systems and methods for constructing a Hybrid Automatic Repeat Request (HARQ) codebook are provided. In some embodiments, a method performed by a User Equipment (UE) includes constructing a dynamic HARQ codebook with a first set of HARQ ACK bits being associated with dynamically scheduled Physical Downlink Shared Channels (PDSCHs) and a second set of HARQ ACK bits being associated with Semi-Persistent Scheduling (SPS) PDSCHs; and ordering the second set of HARQ ACK bits according to the SPS PDSCH index. In some embodiments, the UE receives, from a network node, a plurality of downlink SPS PDSCHs, each with a SPS configuration index and the UE sends, to the network node, HARQ ACK feedback associated with the SPS PDSCHs. In this way, HARQ ACK feedback is enabled for multiple DL SPS configured for a (Continued)

UE with possibly overlapping time domain resource allocations.

10 Claims, 20 Drawing Sheets

(56) References Cited

U.S. PATENT DOCUMENTS

| | | | | |
|---|---|---|---|---|
| 2019/0103943 A1* | 4/2019 | Wang | .................... | H04L 1/1854 |
| 2019/0306841 A1* | 10/2019 | Huang | .................. | H04L 5/0055 |
| 2019/0312713 A1* | 10/2019 | Yang | ...................... | H04W 72/23 |
| 2019/0349899 A1* | 11/2019 | Ang | ....................... | H04L 5/0055 |
| 2020/0177323 A1* | 6/2020 | Fakoorian | ............. | H04W 72/21 |
| 2020/0205141 A1* | 6/2020 | Khoshnevisan | ...... | H04L 5/0044 |
| 2020/0413424 A1* | 12/2020 | Fakoorian | ............. | H04W 76/11 |
| 2020/0413425 A1* | 12/2020 | Lin | ........................ | H04L 5/0064 |
| 2021/0021382 A1* | 1/2021 | Chien | ................... | H04L 1/1861 |
| 2022/0061074 A1* | 2/2022 | Babaei | .................. | H04L 5/0053 |
| 2022/0159692 A1* | 5/2022 | Lee | ....................... | H04L 5/0053 |
| 2022/0183038 A1* | 6/2022 | Saber | .................... | H04L 1/1896 |
| 2022/0239445 A1* | 7/2022 | Yoshioka | .............. | H04W 72/23 |
| 2022/0264614 A1* | 8/2022 | Yu | .......................... | H04W 72/23 |
| 2022/0271873 A1* | 8/2022 | Gao | ....................... | H04L 1/1854 |
| 2022/0311556 A1* | 9/2022 | Singh | ................... | H04L 1/1854 |
| 2024/0023135 A1* | 1/2024 | Ye | ......................... | H04L 1/1822 |

FOREIGN PATENT DOCUMENTS

| | | |
|---|---|---|
| CN | 109474391 A | 3/2019 |
| CN | 109639398 A | 4/2019 |
| WO | 2017160350 A1 | 9/2017 |
| WO | 2018018620 A1 | 2/2018 |
| WO | 2018131937 A1 | 7/2018 |
| WO | 2020225917 A1 | 11/2020 |
| WO | 2020242944 A1 | 12/2020 |

OTHER PUBLICATIONS

NTT Docomo, Inc., "R1-1906219: Physical layer enhancements for DL SPS," 3GPP TSG RAN WG1 #97, May 13-17, 2019, Reno, Nevada, 7 pages.
Notice of Reasons for Refusal for Japanese Patent Application No. 2022-506830, mailed Mar. 3, 2023, 12 pages.
Second Office Action for Chinese Patent Application No. 202080058046.2, mailed Jul. 30, 2024, 24 pages.
International Preliminary Report on Patentability for International Patent Application No. PCT/IB2020/057700, mailed Nov. 4, 2021, 19 pages.
Decision on Rejection for Chinese Patent Application No. 202080058046.2, mailed Jan. 21, 2025, 21 pages.
Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Huawei, et al., "R1-162105: Discussion on SPS HARQ-ACK bit handling in case of dynamic codebook configuration for eCA," 3GPP TSG RAN WG1 Meeting #84bis, Apr. 11-15, 2016, Busan, Korea, 5 pages.
Samsung, "R1-1906961: Discussion on DL SPS," 3GPP RAN WG1 #97, May 13-17, 2019, Reno, Nevada, 5 pages.
Invitation to Pay Additional Fees and Partial Search for International Patent Application No. PCT/IB2020/057700, mailed Oct. 26, 2020, 10 pages.
International Search Report and Written Opinion for International Patent Application No. PCT/IB2020/057700, mailed Dec. 17, 2020, 19 pages.

* cited by examiner

| $\tilde{o}_0^{Ack}$ | $\tilde{o}_1^{Ack}$ | $\tilde{o}_2^{Ack}$ | $\tilde{o}_3^{Ack}$ | $\tilde{o}_4^{Ack}$ |
|---|---|---|---|---|
| cell 0 monitoring occasion 0 | cell 1 monitoring occasion 0 | cell 0 monitoring occasion 1 | cell 0 monitoring occasion 2 | cell 1 monitoring occasion 2 |

FIG. 7

| $\tilde{o}_0^{Ack}$ | $\tilde{o}_1^{Ack}$ | $\tilde{o}_2^{Ack}$ | $\tilde{o}_3^{Ack}$ | $\tilde{o}_4^{Ack}$ | $\tilde{o}_5^{Ack}$ | $\tilde{o}_6^{Ack}$ |
|---|---|---|---|---|---|---|
| cell 0 monitoring occasion 0 | cell 1 monitoring occasion 0 | cell 0 monitoring occasion 1 | cell 0 monitoring occasion 2 | cell 1 monitoring occasion 2 | cell 0 SPS | cell 1 SPS |

FIG. 8

| |
|---|
| HARQ-ACK bits for dynamically scheduled PDSCH, TRP#1, cell#1 |
| HARQ-ACK bits for DL-SPS scheduled PDSCH, TRP#1, cell#1 |
| HARQ-ACK bits for dynamically scheduled PDSCH, TRP#2, cell#1 |
| HARQ-ACK bits for DL-SPS scheduled PDSCH, TRP#2, cell#1 |
| HARQ-ACK bits for dynamically scheduled PDSCH, TRP#1, cell#2 |
| HARQ-ACK bits for DL-SPS scheduled PDSCH, TRP#1, cell#2 |
| HARQ-ACK bits for dynamically scheduled PDSCH, TRP#2, cell#2 |
| HARQ-ACK bits for DL-SPS scheduled PDSCH, TRP#2, cell#2 |

*FIG. 14*

| |
|---|
| HARQ-ACK bits for dynamically scheduled PDSCH, TRP#1, cell#1 |
| HARQ-ACK bits for DL-SPS scheduled PDSCH, TRP#1, cell#1 |
| HARQ-ACK bits for dynamically scheduled PDSCH, TRP#1, cell#2 |
| HARQ-ACK bits for DL-SPS scheduled PDSCH, TRP#1, cell#2 |
| HARQ-ACK bits for dynamically scheduled PDSCH, TRP#2, cell#1 |
| HARQ-ACK bits for DL-SPS scheduled PDSCH, TRP#2, cell#1 |
| HARQ-ACK bits for dynamically scheduled PDSCH, TRP#2, cell#2 |
| HARQ-ACK bits for DL-SPS scheduled PDSCH, TRP#2, cell#2 |

*FIG. 15*

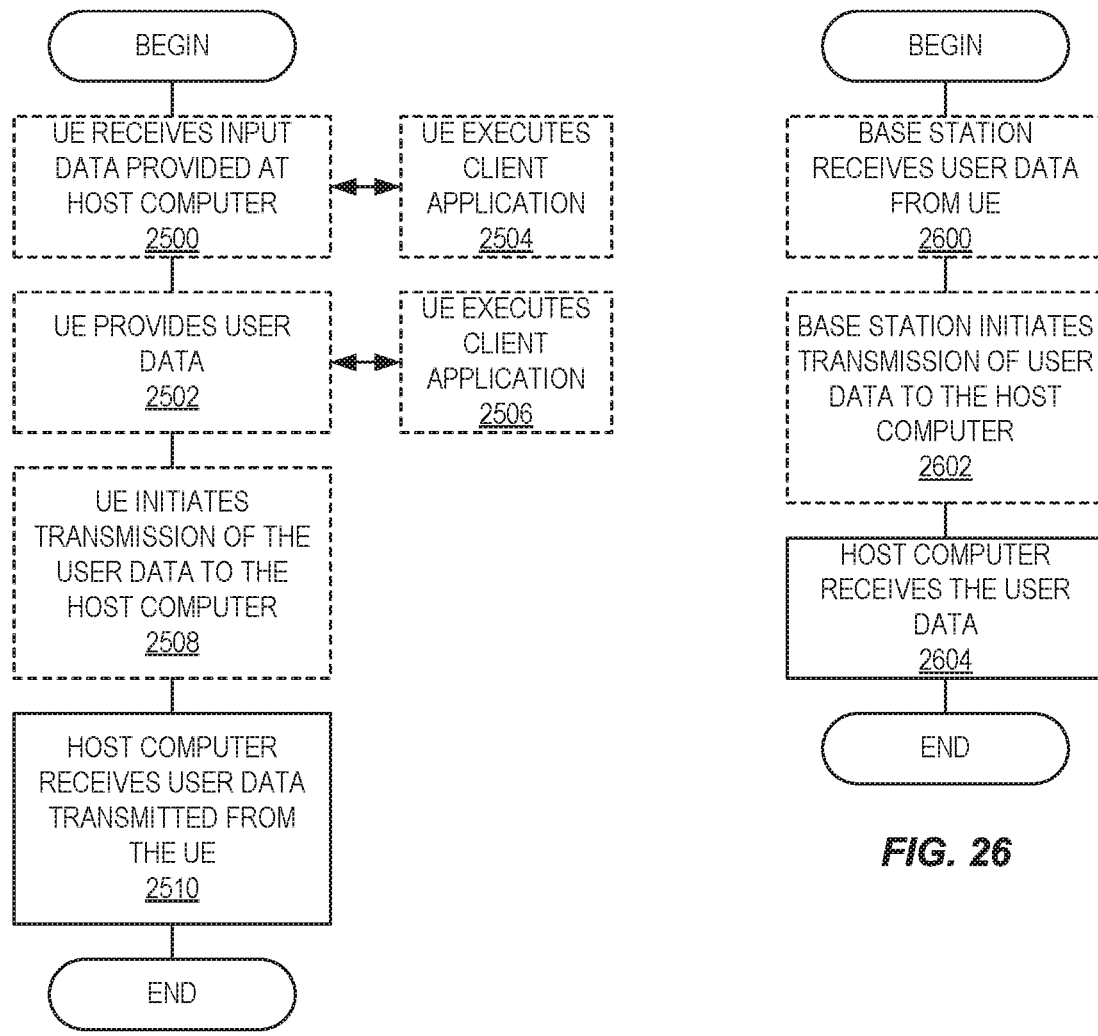

HARQ CODEBOOKS FOR MULTIPLE DL SPS

RELATED APPLICATIONS

This application is a 35 U.S.C. § 371 national phase filing of International Application No. PCT/IB2020/057700, filed Aug. 14, 2020, which claims the benefit of provisional patent application Ser. No. 62/888,095, filed Aug. 16, 2019, the disclosures of which are hereby incorporated herein by reference in their entireties.

TECHNICAL FIELD

The present disclosure relates to Hybrid Automatic Repeat Request (HARQ) codebooks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The next generation mobile wireless communication system (5G) or new radio (NR) will support a diverse set of use cases and a diverse set of deployment scenarios. The later includes deployment at both low frequencies (below 6 Gigahertz (GHz)) and very high frequencies (up to 10's of GHz).

NR Frame Structure and Resource Grid: NR uses Cyclic Prefix Orthogonal Frequency Division Multiplexing (CP-OFDM) in both downlink (i.e., from a network node, New Radio Base Station (gNB), or base station to a User Equipment (UE)) and uplink (i.e., from UE to gNB). Discrete Fourier Transform (DFT) spread Orthogonal Frequency Division Multiplexing (OFDM) is also supported in the uplink. In the time domain, NR downlink and uplink are organized into equally-sized subframes of 1 millisecond (ms) each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

Data scheduling in NR is typically on a slot basis; an example is shown in FIG. 1 which illustrates a NR time-domain structure with 15 kHz subcarrier spacing and a 14-symbol slot, where the first two symbols contain Physical Downlink Control Channels (PDCCHs) and the rest contain physical shared data channels, either Physical Downlink Shared Channels (PDSCHs) or Physical Uplink Shared Channels (PUSCHs).

Different subcarrier spacing values are supported in NR. The supported subcarrier spacing values (also referred to as different numerologies) are given by $\Delta f=(15 \times 2^\mu)$ kHz where $\in 0,1,2,3,4$. $\Delta f=15$ kHz is the basic subcarrier spacing. The slot durations at different subcarrier spacings is given by $1/2^\mu$ ms.

In the frequency domain, a system bandwidth is divided into resource blocks (RBs), each corresponding to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink transmissions are dynamically scheduled, i.e., in each slot the gNB transmits Downlink Control Information (DCI) over the PDCCH about which UE data is to be transmitted to and which RBs in the current downlink slot the data is transmitted on. The UE data are carried on the PDSCH.

There are two DCI formats defined for scheduling PDSCHs in NR, i.e., DCI format 1_0 and DCI format 1_1. DCI format 1-0 has a smaller size than DCI 1_1 and can be used when a UE is not fully connected to the network, while DCI format 1_1 can be used for scheduling Multiple-Input-Multiple-Output (MIMO) transmissions with two Transport Blocks (TBs).

CORESET and Search Space: A PDCCH consists of one or more control-channel elements (CCEs) as indicated in Table 1 below. A CCE consists of 6 resource-element groups (REGs) where a REG equals one RB during one OFDM symbol.

TABLE 1

NR supported PDCCH aggregation levels.

| Aggregation level | Number of CCEs |
|---|---|
| 1 | 1 |
| 2 | 2 |
| 4 | 4 |
| 8 | 8 |
| 16 | 16 |

A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per bandwidth part for monitoring PDCCH candidates.

A search space set is defined over a Control Resource Set (CORESET). A CORESET consists of $N_{RB}^{CORESET}$ resource blocks in the frequency domain and $N_{symb}^{CORESET} \in \{1,2,3\}$ consecutive OFDM symbols in the time domain. In NR Rel-15, a UE can be configured with up to three CORESETs per bandwidth part. For each CORESET, a UE is configured by Radio Resource Control (RRC) signaling with CORESET Information Element (IE), which includes the following:
- a CORESET index p, $0 \leq p < 12$;
- a Demodulation Reference Signal (DM-RS) scrambling sequence initialization value;
- a precoder granularity for a number of REGs in the frequency domain where the UE can assume use of a same DM-RS precoder;
- a number of consecutive symbols;
- a set of resource blocks;
- CCE-to-REG mapping parameters;

a list of up to 64 Transmission Configuration Indication (TCI) states (TCI-States) can be configured in a CORESET p. These TCI states are used to provide Quasi-Colocation (QCL) relationships between the source downlink Reference Signals (RS(s)) in one RS Set in the TCI State and the PDCCH DMRS ports (i.e., for DMRS ports for PDCCHs received in one of the search spaces defined over CORESET p). The source downlink RS(s) can either be a Channel State Information Reference Signal (CSI-RS) or Synchronization Signal Block (SSB);

an indication for a presence or absence of a Transmission Configuration Indication (TCI) field for DCI format 1_1 transmitted by a PDCCH in CORESET p.

For each search space set, a UE is configured with the following:

a search space set index s, $0 \leq s < 40$ an association between the search space set s and a CORESET p a PDCCH monitoring periodicity of $k_s$ slots and a PDCCH monitoring offset of $o_s$ slots a PDCCH monitoring pattern within a slot, indicating first symbol(s) of the CORESET within a slot for PDCCH monitoring a duration of $T_s < k_s$ slots indicating a number of slots that the search space set s exists a number of PDCCH candidates $M_s^{(L)}$ per CCE aggregation level L an indication that search space set s is either a CSS set or a USS set DCI formats to monitoring For search space set s, the UE determines that a PDCCH monitoring occasion(s) exists in a slot with slot number $n_{s,f}^\mu$ in a frame with frame number f if $(n_f N_{slot}^{frame,\mu} + n_{s,f}^\mu - o_s)$ mod $k_s = 0$. The UE monitors PDCCH for search space set s for $T_s$ consecutive slots, starting from slot $n_{s,f}^\mu$, and does not monitor PDCCH for search space set s for the next $k_s - T_s$ consecutive slots.

A UE first detects and decodes PDCCH and, if the decoding is successful, it then decodes the corresponding PDSCH based on the decoded control information in the PDCCH. When a PDSCH is successfully decoded, the Hybrid Automatic Repeat Request (HARQ) ACK is sent to the gNB over the Physical Uplink Control Channel (PUCCH). Otherwise, a HARQ NACK is sent to the gNB over PUCCH so that data of the PDSCH can be retransmitted to the UE. If the PUCCH overlaps with a PUSCH transmission, HARQ feedback can also be conveyed on PUSCH.

Uplink data transmissions are also dynamically scheduled using a PDCCH. Similar to when scheduling a PDSCH for the downlink, a UE first decodes uplink grants in PDCCH and then transmits data over a PUSCH based on the decoded control information in the uplink grant such as modulation order, coding rate, uplink resource allocation, etc.

To schedule uplink and downlink using a PDCCH, multiple downlink control information (DCI) formats have been defined. For scheduling PDSCHs, there are two formats, 1_0 and 1_1, detailed in the following. In addition, in order to ensure that the received PDCCH is intended for the particular UE, each UE has a set of radio network temporary identifiers (RNTIs). If the RNTI of the detected PDCCH matches an RNTI for the UE, then the UE will take action based on the information in the DCI. Otherwise the UE will ignore the DCI.

DCI format 1_0 is used for the scheduling of a PDSCH in one downlink cell. The following information is transmitted by means of the DCI format 1-0 with Cyclic Redundancy Check (CRC) scrambled by Cell Radio Network Temporary Identifier (C-RNTI) or Configured Scheduling Radio Network Temporary Identifier (CS-RNTI) or Modulation and Coding Scheme (MCS) Cell Radio Network Temporary Identifier (MCS-C-RNTI):

Identifier for DCI formats
Frequency domain resource assignment
Time domain resource assignment
Modulation and coding scheme
New data indicator
Redundancy version
HARQ process number
Downlink assignment index—2 bits as counter Downlink Assignment Index (DAI)
PUCCH resource indicator
PDSCH-to-HARQ feedback timing indicator DCI format 1_1 is used for the scheduling of PDSCH in one cell. The following information is transmitted by means of the DCI format 1-1 with CRC scrambled by C-RNTI or CS-RNTI or MCS-C-RNTI:

Identifier for DCI formats
Carrier indicator
Bandwidth part indicator
Frequency domain resource assignment
Time domain resource assignment (TDRA)
For transport block (TB) 1:
   Modulation and coding scheme—5 bits ($I_{MCS}$)
   New data indicator (NDI)—1 bit
   Redundancy version—2 bits ($rv_{id}$)
For transport block (TB) 2 (only present if maxNrofCodeWordsScheduledByDCI equals 2):
   Modulation and coding scheme—5 bits ($I_{MCS}$)
   New data indicator (NDI)—1 bit
   Redundancy version—2 bits ($rv_{id}$)
HARQ process number
Downlink assignment index (DAI)—2 bit counter DAI and 2 bit total DAI (if more than one cell is configured)
PUCCH resource indicator (PRI)
PDSCH-to-HARQ feedback timing indicator (K1)—0, 1, 2, or 3 bits. The bit width for this field is determined as $[\log_2(I)]$ bits, where I is the number of entries in the higher layer parameter dl-DataToUL-ACK.

The maximum number of TBs or codewords that can be scheduled by DCI format 1-1 is configured by a higher layer parameter maxNrofCodeWordsScheduledByDCI. Using this parameter, either 1 or 2 codewords can be configured. In case the higher layer parameter maxNrofCodeWordsScheduledByDCIindicates that two codeword transmission is enabled, then one of the two transport blocks is disabled by DCI format 1-1 if $I_{MCS}=26$ and if $rv_{id}=1$ for the corresponding transport block, where $I_{MCS}$ is the MCS (modulation and coding scheme) index and $rv_{id}$ is the redundancy version, both indicated in DCI 1_1. If both transport blocks are enabled, transport block 1 and 2 are mapped to codeword 0 and 1 respectively. If only one transport block is enabled, then the enabled transport block is always mapped to the first codeword.

PDSCH Resource Allocation in Time Domain: When the UE is scheduled to receive a PDSCH by a DCI, the Time Domain Resource Assignment (TDRA) field value m of the DCI provides a row index m+1 to an allocation table. The determination of the used resource allocation table is defined in sub-clause 5.1.2.1.1 of 3GPP TS38.214 v15.6.0, where either a default PDSCH time domain allocation A, B, or C according to tables 5.1.2.1.1-2, 5.1.2.1.1-3, 5.1.2.1.1-4 and 5.1.2.1.1-5 is applied, or the higher layer configured parameter pdsch-TimeDomainAllocationList in either pdsch-ConfigCommon or pdsch-Config is applied.

For a DCI with CRC scrambled by C-RNTI, MCS-C-RNTI, CS-RNTI, the applicable TDRA is shown in Table 2.

TABLE 2

Applicable PDSCH time domain resource allocation

| RNTI | PDCCH search space | pdsch-ConfigCommon includes pdsch-TimeDomainAllocationList | pdsch-Config includes pdsch-TimeDomainAllocationList | PDSCH time domain resource allocation to apply |
|---|---|---|---|---|
| C-RNTI, MCS-C-RNTI, CS-RNTI | Any common search space associated with CORESET 0 | No Yes | — — | Default A pdsch-TimeDomainAllocationList provided in pdsch-ConfigCommon |
| C-RNTI, MCS-C-RNTI, CS-RNTI | Any common search space not associated with CORESET 0 | No Yes | No No | Default A pdsch-TimeDomainAllocationList provided in pdsch-ConfigCommon |
| | UE specific search space | No/Yes | Yes | pdsch-TimeDomainAllocationList provided in pdsch-Config |

The default PDSCH time domain resource allocation A for normal CP is shown in Table 3, where the indexed row defines directly the slot offset K0, the start symbol S within the slot and the PDSCH allocation length L in symbols, and the PDSCH mapping type to be assumed in the PDSCH reception. Either Type A (i.e., slot based PDSCH transmission) or Type B (i.e., mini-slot based PDSCH transmission) may be indicated.

TABLE 3

Default PDSCH time domain resource allocation A for normal CP (Table 5.1.2.1.1-2 of 3GPP TS38.214 v15.6.0)

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

In case that pdsch-TimeDomainAllocationList is configured, the pdsch-TimeDomainAllocationList contains a list of PDSCH-Time Domain Resource Allocation Information Elements (IEs) as shown below, where the start symbol S and the allocation length L are jointly encoded in startSymbolAndLength as the start and length indicator SLIV.

```
PDSCH-TimeDomainResourceAllocation ::=    SEQUENCE {
    k0                    INTEGER(0..32)
    mappingType           ENUMERATED {typeA, typeB},
    startSymbolAndLength  INTEGER (0..127)
}
```

The valid S and L values are shown in Table 4 below for PDSCH mapping type A and type B.

TABLE 4

Valid S and L combinations (Table 5.1.2.1-1 of 3gpp TS38.214 v15.6.0)

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

Note that for Type A PDSCH, the TDRAs in the pdsch-TimeDomainAllocationList or in the default table A shown in Table 3 are partially overlapping and only one PDSCH can be scheduled in a slot per serving cell in NR Release 15.

For Type B PDSCH, some of the TDRAs in the pdsch-TimeDomainAllocationList or in the default table A may be non-overlapping since the start position of the PDSCH can be more flexibly chosen, and thus more than one PDSCH may be scheduled in a slot. FIG. 3 shows some examples of Type A and Type B PDSCH, where in FIG. 3(d) two type B PDSCHs are scheduled in a slot.

Downlink (DL) SPS: In NR downlink, the PDSCH can be scheduled with either dynamic assignments or by using DL Semi-Persistent Scheduling (SPS). In case of dynamic assignments, the gNB provides a DL assignment to the UE for each DL transmission (i.e., PDSCH). In case of DL SPS, some of the transmission parameters (i.e., those indicated by DCI in dynamic scheduling) are pre-configured using RRC signaling from the network to the UE, while the remainder of the transmission parameters are L1 signaled via a single DCI during the SPS activation. In the subsequent slots configured for DL SPS, there is no DCI transmitted for the SPS PDSCHs; the UE thus use the RRC and SPS activation parameters to perform the SPS PDSCH reception in subsequent slots configured for DL SPS. That is, some of the transmission parameters are semi-statically configured via RRC, and the remaining transmission parameters are provided by a DCI which activates the DL SPS process. To stop such DL SPS transmission, a "release" is indicated to the UE from the network. The scheduling release (also called deactivation) of the DL SPS process is signaled, by the gNB to the UE, using a new DCI.

In Rel-15, the SPS-Config IE is the information element in RRC used to configure downlink semi-persistent transmission. As can be seen, the periodicity of the transmission, the number of HARQ processes, the PUCCH resource identifier, and the possibility to configure an alternative MCS table can be configured by this information element. Downlink SPS may be configured on the SpCell (i.e., on a primary cell on a secondary cell group in dual connectivity) as well as on Secondary Cells (SCells), but it shall not be configured for more than one serving cell of a cell group at once.

SPS-Config Information Element uling a PDSCH reception ending in slot n or if the UE detects a DCI format 1_0 indicating a SPS PDSCH release through a PDCCH reception ending in slot n, the UE provides corresponding HARQ-ACK information in a PUCCH transmission within slot n+k, where k is a number of slots and is indicated by the PDSCH-to-HARQ-timing-indicator field in the DCI format, if present, or if not present, directly provided by the higher layer configuration parameter dl-DataToUL-ACK. If k=0 is indicated, it corresponds to transmitting PUCCH with HARQ-ACK in the uplink slot of the PUCCH transmission that overlaps with the PDSCH reception or with the PDCCH reception in case of SPS PDSCH release.

For an SPS PDSCH reception ending in slot n, the UE transmits the PUCCH in slot n+k where k is provided by the PDSCH-to-HARQ-timing-indicator field in DCI format 1_0 or, if present, in DCI format 1_1 which were used in activating the SPS PDSCH reception.

The parameter k is also referred to as K1 when content of DCI is discussed, as K1 is the parameter name in DCI that provides the offset. For DCI format 1_0, K1 can be one of $\{1, 2, 3, 4, 5, 6, 7, 8\}$. For DCI format 1_1, K1 can be one of a set of values as configured in the higher layer configured parameter dl-DataToUL-ACK. The set of values can be in the range of $\{0, 1, \ldots, 15\}$. Up to 8 values can be configured in the set as there are 3 bits for K1 in DCI.

In case of Carrier Aggregation (CA) with multiple carriers and/or Time Division Duplexing (TDD) operation, multiple aggregated HARQ ACK/NACK bits may need to be sent in a single PUCCH resource.

In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated Uplink Control Information (UCI) bits to be sent in the slot. The UCI bits consist of HARQ ACK/NACKs, scheduling requests (SRs), and channel state information (CSI) bits.

If the UE transmits $O_{UCI}$ UCI information bits, the UE determines a PUCCH resource set to be
 a first set of PUCCH resources with pucch-ResourceSetId=0 if $O_{UCI} \leq 2$ including 1 or 2 HARQ-ACK infor-

```
-- ASN1START
-- TAG-SPS-CONFIG-START
SPS-Config :: =          SEQUENCE {
  periodicity            ENUMERATED {ms10, ms20, ms32, ms40, ms64,
ms80, ms128, ms160, ms320, ms640,
                         spare6, spare5, spare4, spare3, spare2, spare1},
  nrofHARQ-Processes     INTEGER (1..8),
  n1PUCCH-AN             PUCCH-ResourceId
OPTIONAL,   -- Need M
  mcs-Table              ENUMERATED {qam64LowSE}
OPTIONAL,   -- Need S
  ...
}
-- TAG-SPS-CONFIG-STOP
-- ASN1STOP
```

NR HARQ ACK/NACK feedback over PUCCH: Some rules are defined in NR regarding when the UE shall transmit HARQ-ACK, associated with a received PDSCH.

With reference to slots for PUCCH transmissions, if the UE detects a DCI format 1_0 or a DCI format 1_1 schedmation bits and a positive or negative SR on one SR transmission occasion if transmission of HARQ-ACK information and SR occurs simultaneously, or
 a second set of PUCCH resources with pucch-ResourceSetId=1, if provided by higher layers, if $2 < O_{UCI} \leq N_2$, or a third set of PUCCH resources with pucch-Resource-SetId=2, if provided by higher layers, if $N_2 < O_{UCI} \leq N_3$, or a fourth set of PUCCH resources with pucch-Resource-SetId=3, if provided by higher layers, if $N_3 < O_{UCI} \leq 1706$, where $N_1 < N_2 < N_3$ are parameters that are provided to the UE from network by higher layer signalling.

For a PUCCH transmission with HARQ-ACK information, a UE determines a PUCCH resource after determining a PUCCH resource set. The PUCCH resource determination is based on a 3-bit PUCCH resource indicator (PRI) field in DCI format 1_0 or DC format 1_1.

If more than one DCI format 1_0 or 1_1 are received in the case of CA and/or TDD, the PUCCH resource determination is based on a PUCCH resource indicator (PRI) field in the last DCI format 1_0 or DCI format 1-1 among the multiple received DCI format 1_0 or DCI format 1-1 that the UE detects. The multiple received DCI format 1_0 or DCI format 1_1 have a value of a PDSCH-to-HARQ_feedback timing indicator field indicating a same slot for the PUCCH transmission. For PUCCH resource determination, detected DCI formats are first indexed in an ascending order across serving cells indexes for a same PDCCH monitoring occasion and are then indexed in an ascending order across PDCCH monitoring occasion indexes.

The 3 bits PRI field maps to a PUCCH resource in a set of PUCCH resources with a maximum of eight PUCCH resources. For the first set of PUCCH resources with pucch-ResourceSetId=0 and when the number of PUCCH resources, $R_{PUCCH}$, in the set is larger than eight, the UE determines a PUCCH resource with index $r_{PUCCH}$, $0 \leq r_{PUCCH} \leq R_{PUCCH}-1$, for carrying HARQ-ACK information in response to detecting a last DCI format 1_0 or DCI format 1_1 in a PDCCH reception, among DCI formats 1_0 or DCI formats 1_1 the UE received with a value of the PDSCH-to-HARQ_feedback timing indicator field indicates a same slot for the PUCCH transmission, as:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1 of 3gpp TS38.213 v15.4.0, $n_{CCE,p}$ is the index of a first CCE for the PDCCH reception, and $A_{PRI}$ is a value of the PUCCH resource indicator field in the DCI format 1_0 or DCI format 1_1.

NR HARQ-ACK Codebooks: NR Rel-15 supports two types of HARQ codebooks, i.e., semi-static (type 1) and dynamic (type 2) codebooks, for HARQ Ack/Nack multiplexing for multiple received PDSCHs of one or more component carriers (CCs). A UE can be configured to use either one of the two types of codebooks for HARQ Ack/Nack feedback.

NR Type-1 HARQ-ACK codebook determination: HARQ Codebook (CB) size in time (DL association set) is determined based on the configured set of HARQ-ACK timings K1, a set of row indexes R of a table that is provided by either the pdsch-TimeDomainAllocationList in pdsch-ConfigCommon or by the Default PDSCH time domain resource allocation A and of the pdsch-TimeDomainAllocationList in pdsch-Config, and semi-static configured TDD pattern in case of TDD. For a PDCCH received in slot n for a PDSCH, K1 is signaled in the corresponding DCI and the HARQ A/N feedback for the PDSCH occurs in slot n+K1.

An example of Type 1 HARQ codebook is shown in FIG. 4 for a TDD pattern with a set of K1 from 1 to 5 and a configured time-domain resource allocation table or the pdsch-TimeDomainAllocationList without non-overlapping PDSCH TDRA allocation, i.e., only one PDSCH can be scheduled in a slot. There are two PUCCH slots at slots n and n+5, each carrying Ack/Nack bits associated with the PDSCHs received from the preceding 5 slots. In this example, there are five entries, each with one bit (i.e., corresponding to maximum one TB per PDSCH), in the type 1 HARQ codebook, one for each K1 value. For slots without PDSCH transmission or where no PDSCH is detected, the corresponding entry in the codebook is filled with NACK, which is indicted by 'N' in the figure. In slots where PDSCHs are scheduled, either Ack or Nack is reported in the corresponding codebook entries, which is indicated by 'X' in the figure.

If UE supports reception of more than one unicast PDSCH per slot (i.e., using Type B scheduling), then one HARQ codebook entry for each non-overlapping time-domain resource allocation in the pdsch-TimeDomainAllocationList or in the default PDSCH time domain resource allocation A table is reserved per slot.

In case of MIMO with two codewords, an additional entry is added for each K1 value. In case of multiple CCs, additional rows in the HARQ codebook are added. In component carrier dimension, HARQ codebook size is given by the configured number of DL cells and the max number of HARQ feedback bits based on configuration per DL cell (e.g., MIMO, spatial bundling, configured number of Code Block Groups (CBGs) per TB). An example is shown in FIG. 5, where a semi-static HARQ codebook for a UE is configured with three cells, i.e., cells 1 to 3. Cell 1 is configured with up to 2 TBs per PDSCH, cell 2 with one TB per PDSCH, and cell 3 with one TB and four CBG. For each K1 value, the UE needs to feedback seven bits, i.e., two bits for cell 1, 1 bit for cell 2, and four bits for cell 3 (not considering potential multiple entries per slot based on the PDSCH time domain resource allocation table).

Note that Type 1 HARQ codebook size is fixed (fixed number of feedback bits) after higher layer configuration and does not change dynamically.

NR Type-2 HARQ-ACK codebook determination: Unlike Type 1 HARQ codebook, the size of type 2 HARQ codebook changes dynamically based on the number of DCIs scheduling PDSCH receptions or SPS PDSCH release and associated with a same PUCCH resource for HARQ Ack/NACK feedback. The number of DCIs can be derived based a counter DAI (Downlink Assignment Indicator) field in the DCIs and in case of DCI format 1-1, also a total DAI field if more than one serving cell are configured.

A value of the counter DAI field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion, first in ascending order of serving cell index and then in ascending order of PDCCH monitoring occasion index m, where 0≤m<M and M is total number of PDCCH monitoring occasions.

The value of the total DAI, when present, in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion m and is updated from PDCCH monitoring occasion to PDCCH monitoring occasion.

An example of DAI allocation is shown in FIG. 6, where a UE is configured with two serving cells and three PDCCH monitoring occasions. The corresponding counter DAI and total DAI values after each scheduled DCI are shown. The counter DAI is updated after every scheduled DCI while total DAI is only updated every monitoring occasion. Since only two bits are allocated for either counter DAI or total DAI in DCI, the actual DAI values are wrapped round with a modulo 4 operation. A UE can figure out the actual number of DCIs transmitted even though some DCIs are undetected, if the undetected consecutive DCIs are smaller than four.

For HARQ-ACK information transmitted in a PUCCH in slot n, the UE determines HARQ-ACK information bits associated with dynamic scheduled PDSCHs, $\tilde{o}_0^{ACK}$, $\tilde{o}_1^{ACK}, \ldots, \tilde{o}_{o^{ACK}-1}^{ACK}$, for a total number of $O_{ACK}$ bits, in the order of first in ascending order of serving cell index and then in ascending order of PDCCH monitoring occasion index m. For the example shown in FIG. 6 and if one TB is enabled for both cells, the HARQ information bits $\tilde{o}_0^{ACK}$, $\tilde{o}_1^{ACK}, \ldots, \tilde{o}_{o^{ACK}-1}^{ACK}$ are shown in FIG. 7.

If SPS PDSCH reception is activated for a UE and the UE is configured to receive the SPS PDSCH in a slot n-$k_c$ for serving cell c, where $k_c$ is the PDSCH-to-HARQ-feedback timing value for SPS PDSCH on serving cell c, one additional bit is added at the end of $\tilde{o}_0^{ACK}$, $\tilde{o}_1^{ACK}, \ldots, \tilde{o}_{o^{ACK}-1}^{ACK}$. If the SPS PDSCH is activated in more than one cell and the corresponding HARQ A/N feedback is in slot n, then one bit is added for each of the SPS PDSCHs in ascending order of serving cell index. Using the example in FIG. 6 and if SPS is activated in both cells and the UE is configured to receive the SPS PDSCH with corresponding HARQ feedback in slot n (i.e., HARQ feedback in the same UL slot), then the HARQ-ACK information bits are shown in FIG. 8.

NR Rel-16 Enhancement: In Rel-16, for Industrial Internet of Things (IIoT) support, it has been agreed that multiple DL SPS configurations can be simultaneously active on a Bandwidth Part (BWP) of a serving cell. Separate activation, as well as separate release, for different DL SPS configurations are to be supported for a given BWP of a serving cell. The motivation is, for example, that different IIoT services which may be simultaneously ongoing to the same UE may require different periodicity for PDSCH reception and potentially need different MCS tables.

In Rel-15, only a single DL SPS configuration is supported per BWP in a serving cell. In addition, only one PDSCH can be scheduled in a slot on a given time domain resource in a serving cell, i.e., only non-overlapping transmission is allowed. It becomes a problem when more than one SPS is supported in Rel-16, i.e., how to support HARQ Ack/Nack feedback with type 1 or type 2 HARQ codebook in this case.

More specifically, multiple SPS PDSCHs may occur in certain slots with overlapping time domain resources and handling this is a problem. With Rel-15 Type 1 HARQ codebook, only one HARQ ACK entry is available in the codebook for overlapping time domain resource allocations in a slot, thus only one HARQ ACK information bit can be sent. Given that the periodicity of one slot is allowed for certain time critical Ultra Reliable Low Latency Communication (URLLC) services, it would be hard to avoid collisions between PDSCH transmissions belonging to different DL SPS configurations and also between SPS transmissions of PDSCH and a dynamically scheduled PDSCH in a slot.

In case of Type 2 HARQ codebook, how to order multiple HARQ ACK information bits for multiple SPS PDSCHs associated with a same PUCCH resource in a serving cell is another related problem.

SUMMARY

Systems and methods for constructing a Hybrid Automatic Repeat Request (HARQ) codebook are provided. In some embodiments, a method performed by a User Equipment (UE) includes constructing a dynamic HARQ codebook with a first set of HARQ A/N bits being associated with dynamically scheduled Physical Downlink Shared Channels (PDSCHs) and a second set of HARQ A/N bits being associated with Semi-Persistent Scheduling (SPS) PDSCHs; and ordering the second set of HARQ A/N bits according to the SPS PDSCH index. In some embodiments, the UE receives, from a network node, a plurality of downlink SPS PDSCHs, each with a SPS configuration index and the UE sends, to the network node, HARQ A/N feedback associated with the SPS PDSCHs. In this way, HARQ A/N feedback is enabled for multiple DL SPS configured for a UE with possibly overlapping time domain resource allocations.

Certain aspects of the present disclosure and their embodiments may provide solutions to the aforementioned or other challenges.

In some embodiments, for a type 1 HARQ codebook, the proposed solution includes of allowing J>1 PDSCHs in a slot with overlapping time domain resource allocations and allocating J times of HARQ codebook entries for each K1 comparing to NR Rel-15 HARQ codebook, with separate entries or rows defined in the codebook for DL SPS.

In some embodiments, a for Type 2 HARQ codebook, a method is proposed to order the HARQ A/N bits for DL SPS based on the DL SPS configuration index in either ascending or descending order and multiplexed with the HARQ A/N bits for dynamically scheduled PDSCHs for each serving cell.

In some embodiments, a method, performed in a wireless device for receiving from a network node a plurality of downlink SPS PDSCHs and sending back HARQ A/N feedback associated with the SPS PDSCHs to the network node, comprises:
  receiving a configuration of J>1 allowed PDSCHs with overlapping TDRA in a slot;
  constructing a semi-static HARQ codebook with JxM rows and N columns for each serving cell for HARQ A/N reporting in a uplink slot, where M is a number of transport blocks enabled and N is a number of downlink slots associated with the uplink slot for HARQ A/N reporting multiplied by a number of non-overlapping TDRAs in a slot; and
  sending the semi-static HARQ codebook in the uplink slot by ordering the HARQ codebook entries in certain order.

In some embodiments, the method further comprises associating the first M rows to dynamically scheduled PDSCH(s) and the rest of the rows to SPS PDSCH(s). Note that, in some embodiments, this associating of the first M rows to dynamically scheduled PDSCH(s) and the rest of the rows to SPS PDSCH(s) is performed as part of the step of constructing the semi-static HARQ codebook. This corresponds to the scenario where SPS PDSCH and dynamically scheduled PDSCH are received in a slot.

In some embodiments, the method further comprises associating the first M rows in a column to a first SPS PDSCH and the second M rows to a second SPS PDSCH if two SPS PDSCHs are received in a slot. In some embodiments, the first SPS PDSCH has a smallest SPS index and the second SPS PDSCH has a next smallest SPS index. Note that, in some embodiments, this associating of the first M rows in a column to a first SPS PDSCH and the second M rows to a second SPS PDSCH if two SPS PDSCHs are received in a slot is part of the step of constructing the semi-static HARQ codebook. This corresponds to the scenario where two or more DL SPS are received/configured in a slot.

In some embodiments, the method further comprises associating the first M rows in a column to a first dynamically scheduled PDSCH and the second M rows to a second dynamically scheduled PDSCH if two dynamically scheduled PDSCHs are received in a slot. In some embodiments, the first and the second SPS PDSCH have different RNTI. Note that, in some embodiments, this associating of the first M rows in a column to a first dynamically scheduled PDSCH and the second M rows to a second dynamically scheduled PDSCH if two dynamically scheduled PDSCHs are received in a slot is performed as part of the step of constructing the semi-static HARQ codebook. This corresponds to the scenario where two or more dynamically scheduled PDSCH are received/configured in a slot.

In some embodiments, the semi-static HARQ codebook is constructed separately for dynamically scheduled PDSCHs and SPS PDSCHs.

In some embodiments, in case of SPS PDSCH transmission over multiple Transmission Reception Points (TRP), HARQ bits in the semi-static HARQ codebook are ordered in either TRP first and then serving cells or serving cell first and then TRPs.

In some embodiments, a method performed in a wireless device for receiving from a network node a plurality of downlink SPS PDSCHs, each with a SPS configuration index, and sending back HARQ A/N feedback associated with the SPS PDSCHs to the network node, comprises:
  constructing a dynamic HARQ codebook with a first set of HARQ A/N bits being associated with dynamically scheduled PDSCHs and a second set of HARQ A/N bits being associated with SPS PDSCHs;
  ordering the second set of HARQ A/N bits according to the SPS PDSCH index in either ascending or descending order; and
  sending the HARQ codebook in the uplink slot.

In some embodiments, in case of SPS PDSCH transmission over multiple TRPs, the HARQ bits can be ordered in either TRP first and then serving cells or serving cell first and TRPs.

Certain embodiments may provide one or more of the following technical advantage(s). The solutions enable HARQ A/N feedback for multiple DL SPS configured for a UE with possibly overlapping time domain resource allocations.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates the HARQ information bits $\tilde{o}_0^{ACK}$, $\tilde{o}_1^{ACK}, \ldots, \tilde{o}_{o^{ACK}-1}^{ACK}$ for the example shown in FIG. 6 and if one TB is enabled for both cells;

FIG. 8 illustrates the HARQ-ACK information bits using the example in FIG. 6 and if SPS is activated in both cells and the UE is configured to receive SPS PDSCH with corresponding HARQ feedback in slot n (i.e., HARQ feedback in the same UL slot);

FIG. 14 illustrates an example of aggregated HARQ-ACK bits for two TRPs and two cells, where HARQ-ACK bits of one cell are grouped together, according to some embodiments of the present disclosure;

FIG. 15 illustrates an example of aggregated HARQ-ACK bits for two TRPs and two cells, where HARQ-ACK bits of one TRP are grouped together, according to some embodiments of the present disclosure;

FIGS. 23 through 26 are flowcharts illustrating methods implemented in a communication system, according to some embodiments of the present disclosure.

DETAILED DESCRIPTION

Figure 1:
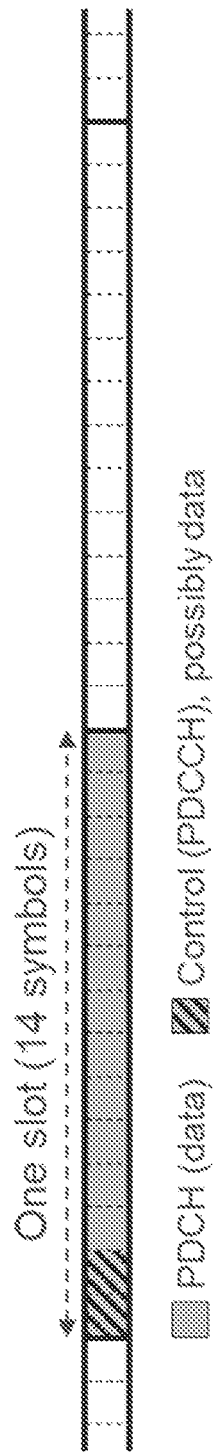
FIG. 1 illustrates an NR time-domain structure with 15 kHz subcarrier spacing and a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
Figure 2:
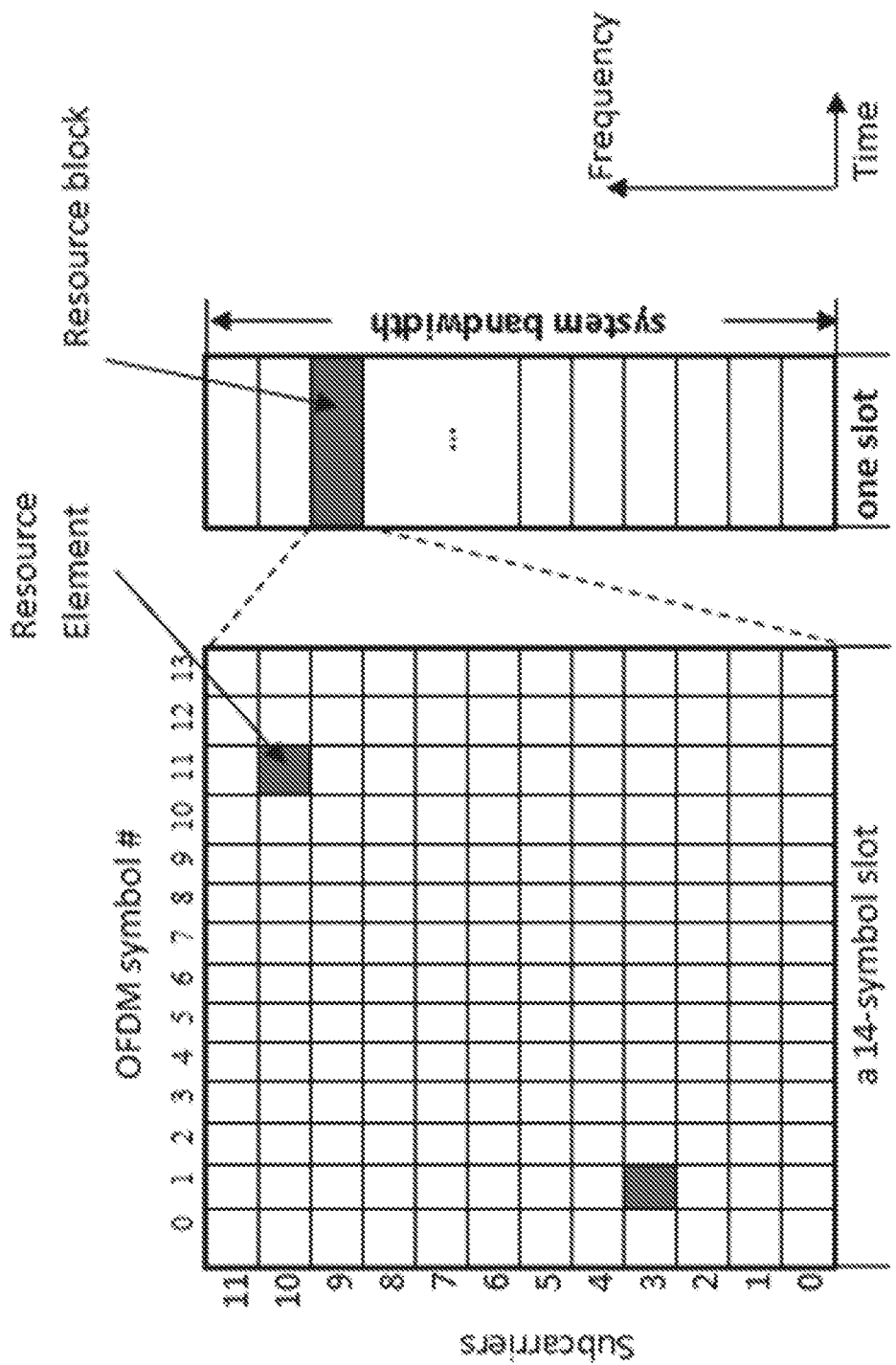
FIG. 2 illustrates a basic NR physical time-frequency resource grid where only one Resource Block (RB) within a 14-symbol slot.
Figure 3:
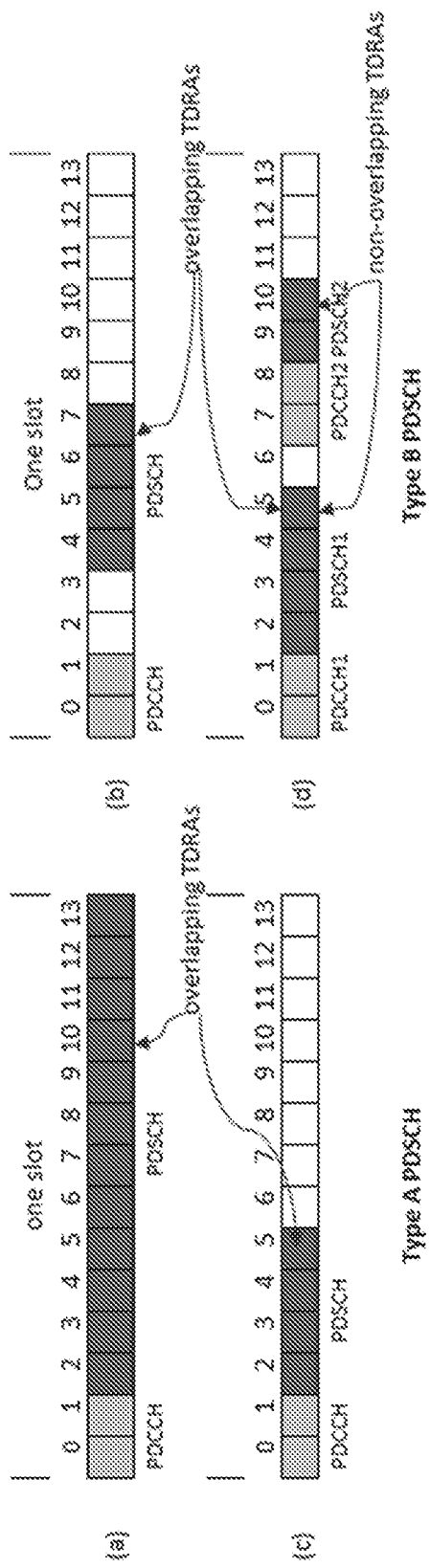
FIG. 3 shows some examples of Type A and Type B PDSCH, where in FIG. 3(d) two type B PDSCHs are scheduled in a slot.
Figure 4:
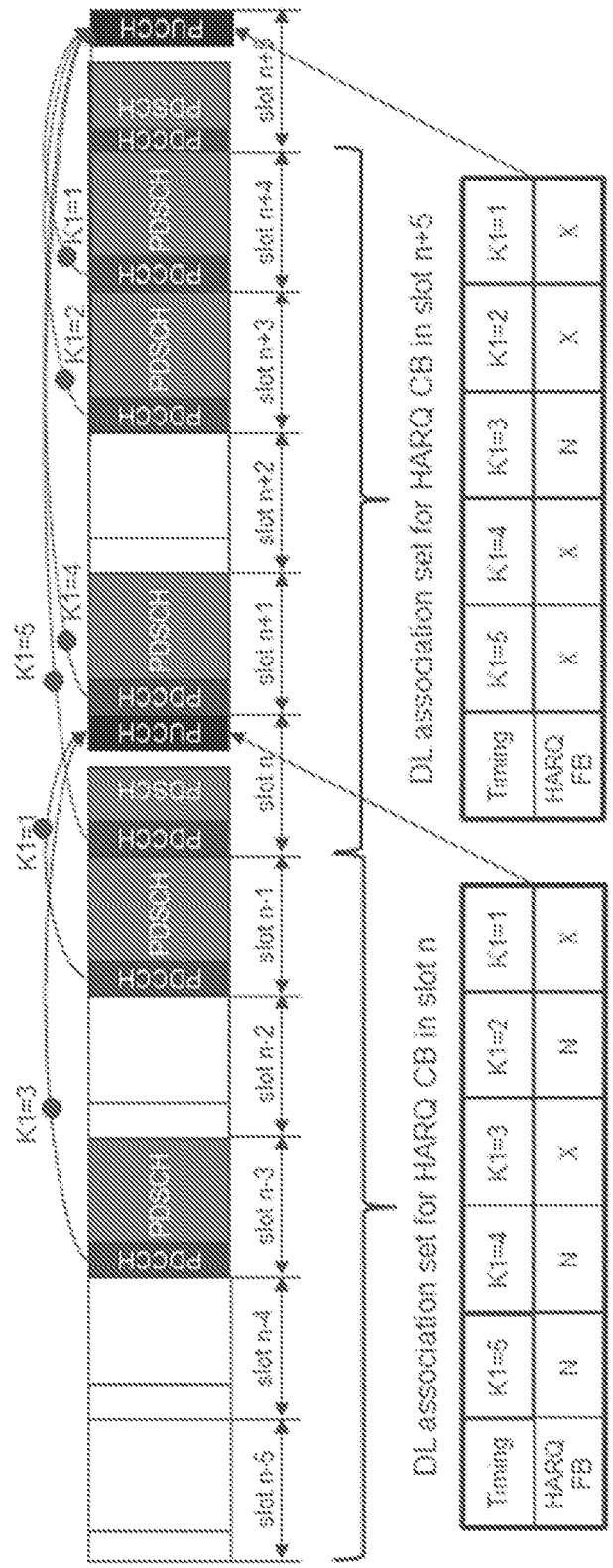
FIG. 4 illustrates an example of Type 1 HARQ codebook for a TDD pattern with a set of K1 from 1 to 5 and a configured time-domain resource allocation table or the pdsch-TimeDomainAllocationList without non-overlapping PDSCH TDRA allocation, i.e., only one PDSCH can be scheduled in a slot.
Figure 5:
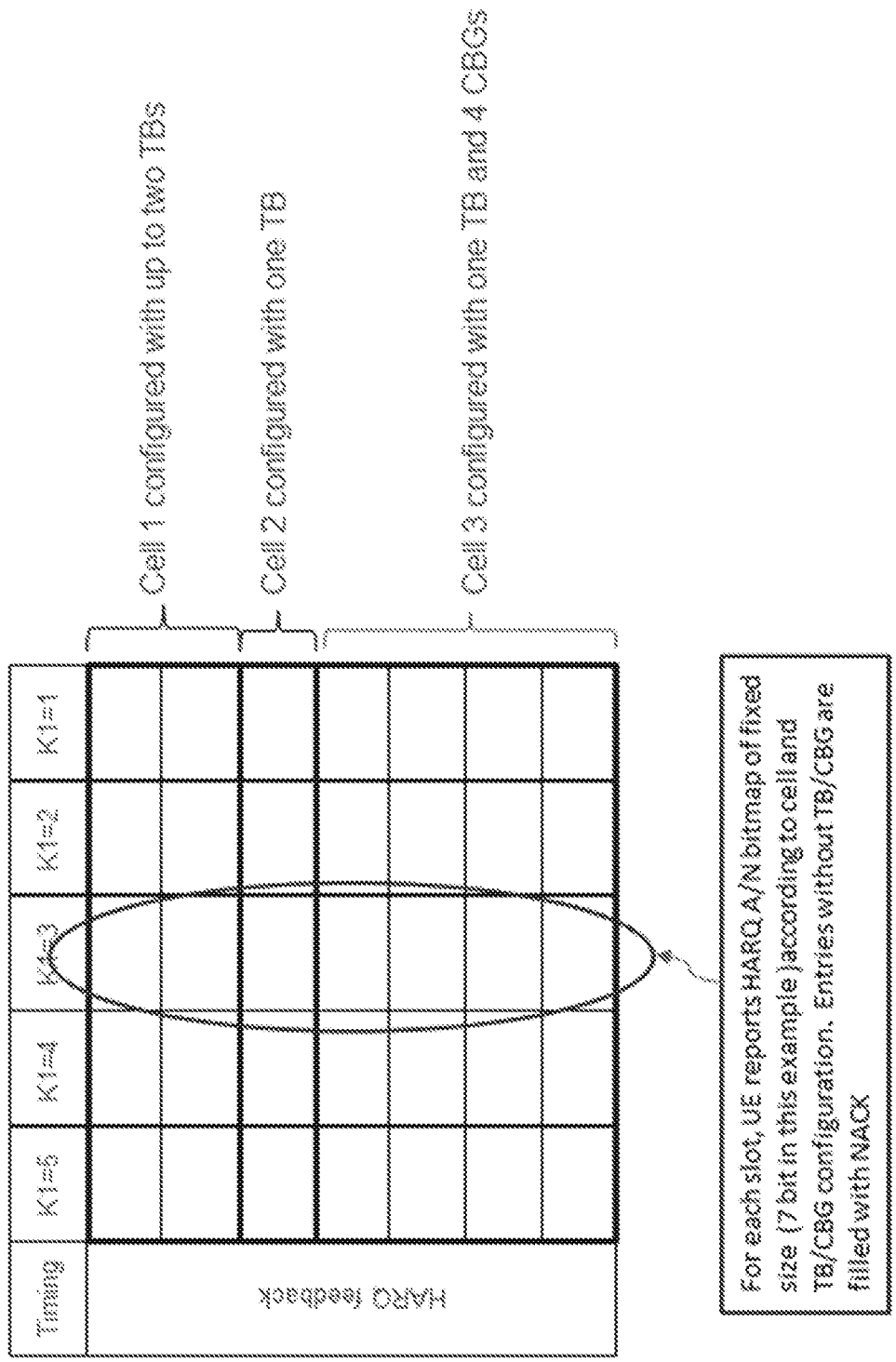
FIG. 5 illustrates a semi-static HARQ codebook for a UE configured with three cells, i.e., cells 1 to 3.
Figure 6:
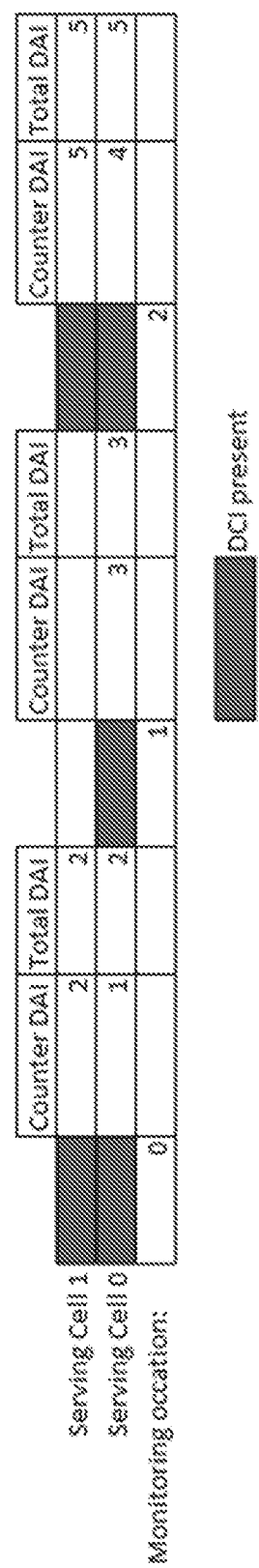
FIG. 6 illustrates an example of DAI allocation where a UE is configured with two serving cells and three PDCCH monitoring occasions.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 9:
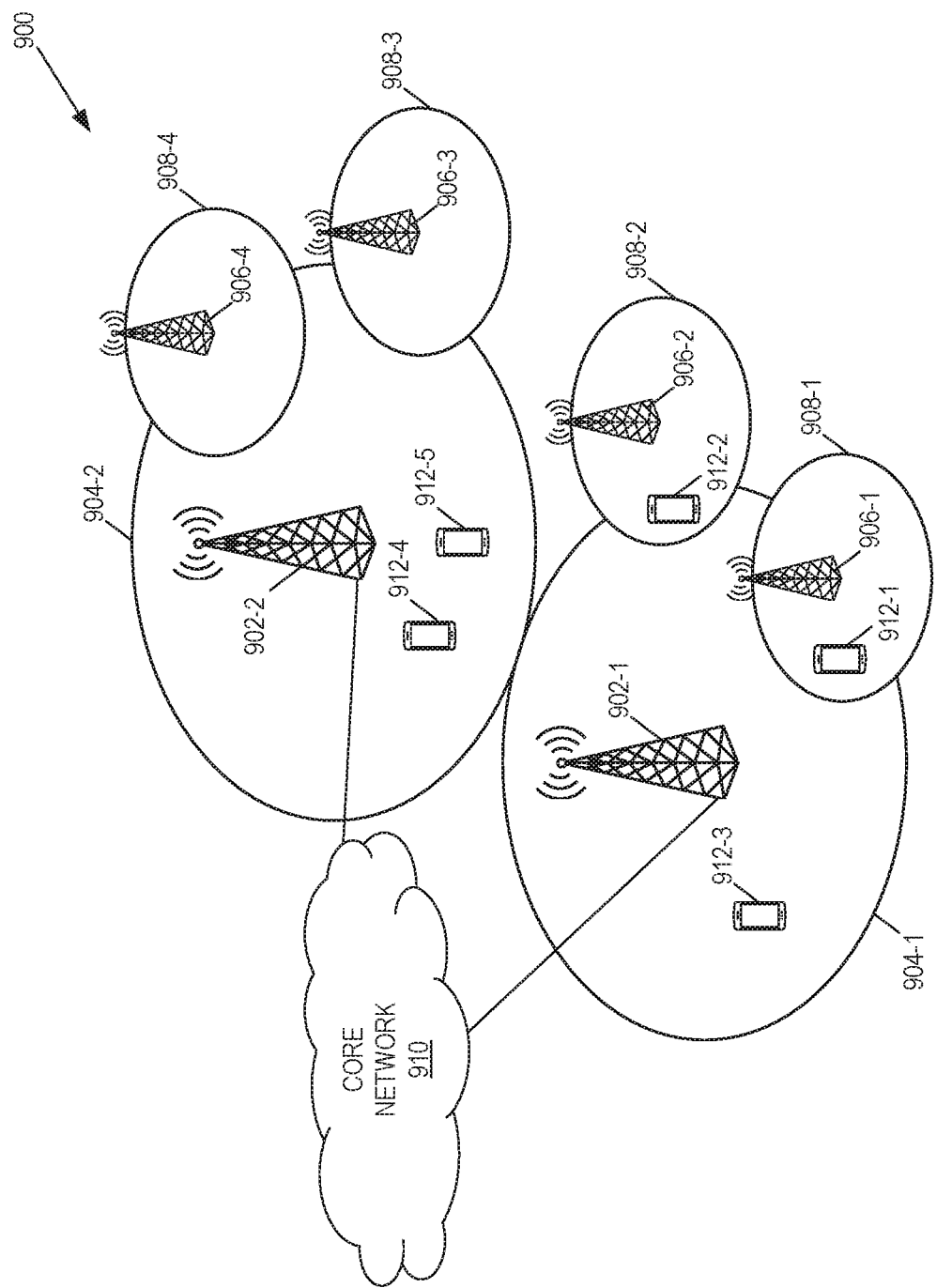
FIG. 9 illustrates one example of a cellular communications system in which embodiments of the present disclosure may be implemented.

In this regard, FIG. 9 illustrates one example of a cellular communications system 900 in which embodiments of the present disclosure may be implemented. In the embodiments described herein, the cellular communications system 900 is a 5G system (5GS) including a NR Radio Access Network (RAN). In this example, the RAN includes base stations 902-1 and 902-2, which in 5G NR are referred to as gNBs, controlling corresponding (macro) cells 904-1 and 904-2. The base stations 902-1 and 902-2 are generally referred to herein collectively as base stations 902 and individually as base station 902. Likewise, the (macro) cells 904-1 and 904-2 are generally referred to herein collectively as (macro) cells 904 and individually as (macro) cell 904. The RAN may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The cellular communications system 900 also includes a core network 910, which in the 5GS is referred to as the 5G core (5GC). The base stations 902 (and optionally the low power nodes 906) are connected to the core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

In Rel-15, only a single DL SPS configuration is supported per BWP in a serving cell. In addition, only one PDSCH can be scheduled in a slot on a given time domain resources in a serving cell, i.e., only non-overlapping transmission is allowed. It becomes a problem when more than one SPS is supported in Rel-16, i.e., how to support HARQ Ack/Nack feedback with type 1 or type 2 HARQ codebook in this case.

More specifically, multiple SPS PDSCHs may occur in certain slots with overlapping time domain resources and how to handle this is a problem. With Rel-15 Type 1 HARQ codebook, only one HARQ ack entry is available in the codebook for overlapping time domain resource allocations in a slot, thus only one HARQ ACK information bit can be sent. Given that the periodicity of one slot is allowed for certain time critical URLLC services, it would be hard to avoid collisions between PDSCH transmissions belonging to different DL SPS configurations and also between SPS transmissions of PDSCH and a dynamically scheduled PDSCH in a slot.

In case of a Type 2 HARQ codebook, how to order multiple HARQ ACK information bits for multiple SPS PDSCHs associated with a same PUCCH resource in a serving cell is another related problem.

In the present disclosure, methods to construct HARQ-ACK codebooks are described when multiple DL-SPS configurations are activated. The HARQ-ACK codebook can be Type 1 (also called semi-static codebook) or Type 2 (also called dynamic codebook).

Systems and methods for constructing a Hybrid Automatic Repeat Request (HARQ) codebook are provided. In some embodiments, a method performed by a User Equipment (UE) includes constructing a dynamic HARQ codebook with a first set of HARQ A/N bits being associated with dynamically scheduled Physical Downlink Shared Channels (PDSCHs) and a second set of HARQ A/N bits being associated with Semi-Persistent Scheduling (SPS) PDSCHs; and ordering the second set of HARQ A/N bits according to the SPS PDSCH index. In some embodiments, the UE receives, from a network node, a plurality of downlink SPS PDSCHs, each with a SPS configuration index and the UE sends, to the network node, HARQ A/N feedback associated with the SPS PDSCHs. In this way, HARQ A/N feedback is enabled for multiple DL SPS configured for a UE with possibly overlapping time domain resource allocations.

The methods can be applied in several variations. In one example, the methods can be applied to PDSCH of different service types. For example, one HARQ-ACK codebook is constructed for enhanced Mobile Broadband service; another HARQ-ACK codebook is constructed for URLLC service. Each of the codebooks can use the methods disclosed herein. In another example, the methods can be applied to a HARQ-ACK codebook constructed using sub-slot units, such that a HARQ-ACK codebook is sent in a sub-slot, leading to possibly multiple HARQ-ACK codebooks sent in a slot. Each of the per-sub-slot HARQ-ACK codebooks can use the methods disclosed herein. In yet another example, the methods can be applied to a HARQ-ACK codebook constructed where the network node contains multiple TRP.

Figure 10:
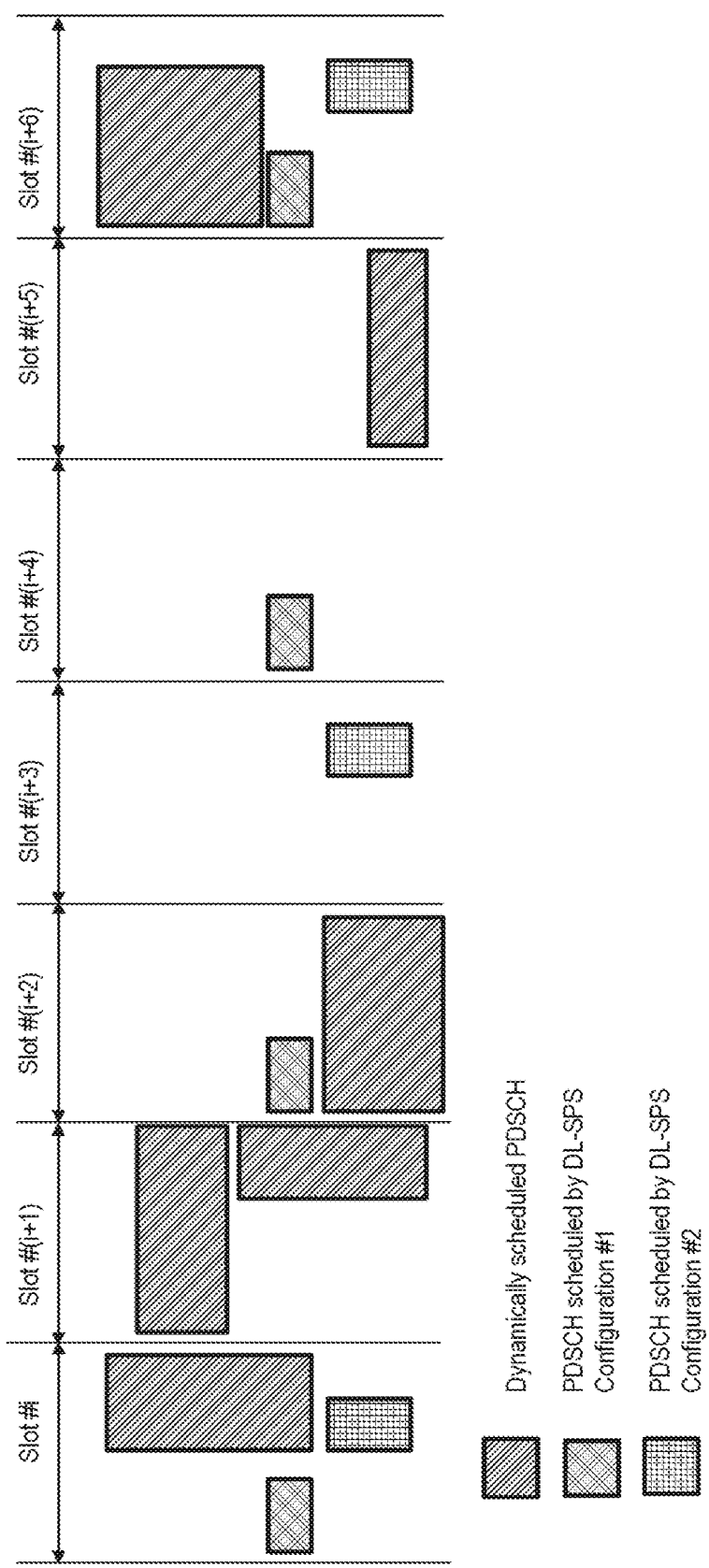
FIG. 10 illustrates an example of PDSCH with a mixture of dynamically scheduled PDSCH and DL SPS scheduled PDSCH, according to some embodiments of the present disclosure.

Embodiment 1: Semi-static (Type 1) HARQ codebook: Since a Type 1 HARQ codebook has a fixed size, a codebook entry is needed for each possible PDSCH reception associated with a same PUCCH resource. In NR Rel-15, a UE is not expected to receive two PDSCHs in a slot with overlapping time domain resource allocations. For example, the PDSCH transmissions in slots #i, #i+1, #i+2, and #i+6 in FIG. 10 (which illustrates an example of PDSCH with a mixture of dynamically scheduled PDSCH and DL SPS scheduled PDSCH) are not expected by a UE in Rel-15. In Rel-16, such transmissions need to be supported.

In one embodiment, the Rel-15 Type 1 HARQ codebook can be extended by allowing J>1 PDSCH transmissions or receptions in overlapping time domain resources in each slot of a serving cell. In some embodiments, each of the J PDSCHs carries a different transport block (TB). J may be semi-statically configured based on UE capability. According to this embodiment, for a given serving cell, the number of HARQ-ACK entries in the semi-static HARQ codebook would be increased by J times for a slot. J=1 corresponds to the Rel-15 Type 1 HARQ codebook.

Figure 11:
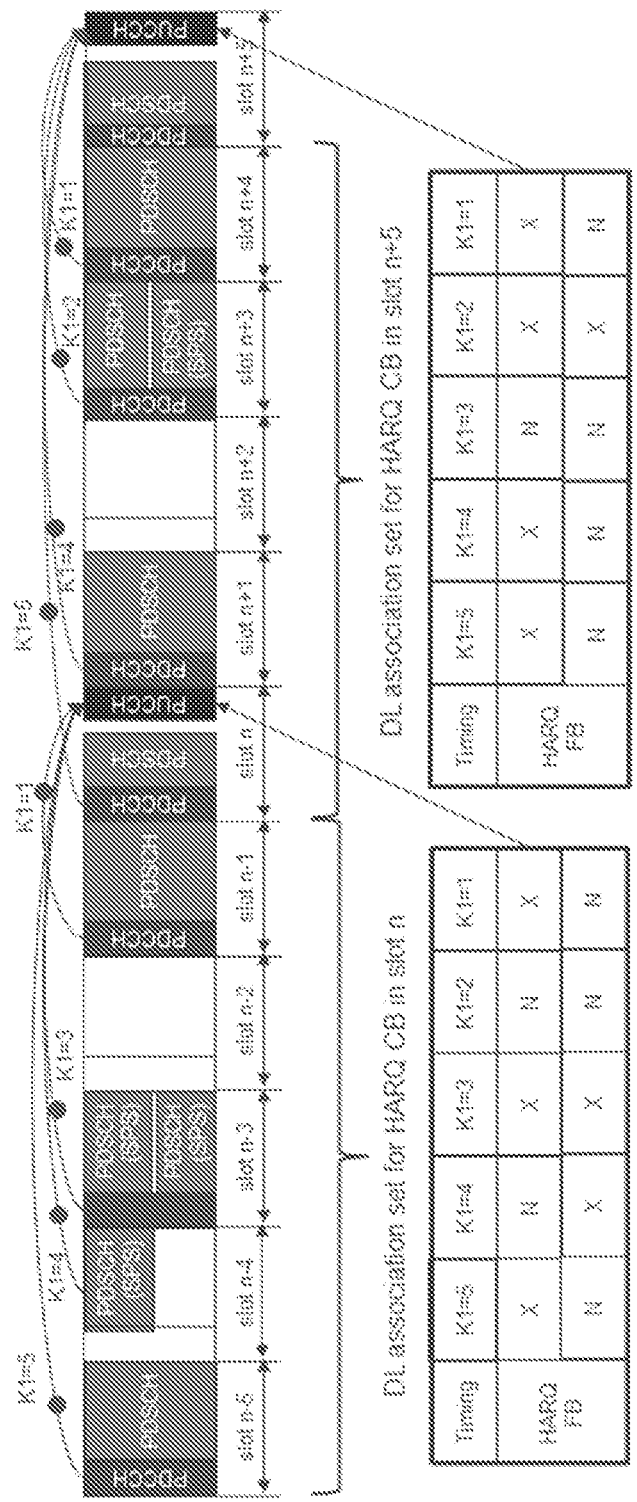
FIG. 11 illustrates a single TB is assumed per PDSCH with J=2, according to some embodiments of the present disclosure.

An example is shown in FIG. 11, where a single TB is assumed per PDSCH with J=2. In this example, the codebook consists of two rows, one for each possible PDSCH reception in a slot in overlapping time domain resources. There are a few scenarios for PDSCH reception in a slot from a UE perspective:

1. A single dynamically scheduled PDSCH. For example, the PDSCH reception in slot #(n−5) in FIG. 11.
2. A single SPS PDSCH corresponding to one DL SPS configuration. For example, the PDSCH reception in slot #(n−4) in FIG. 11.
3. A dynamically scheduled PDSCH and a SPS PDSCH corresponding to one DL SPS configuration. For example, the PDSCH receptions in slot #(n+3) in FIG. 11.
4. Two (or more) dynamically scheduled PDSCHs.
5. Two (or more) SPS PDSCHs corresponding to different DL SPS configurations.

For example, the PDSCH receptions in slot #(n−3) in FIG. 11.

For scenarios 1, 3, and 4, there is a possibility that one dynamically scheduled PDSCH was transmitted but undetected by the UE. Thus, to prevent mis-alignment between gNB and the UE, the mapping from a PDSCH to a row is, in some embodiments, deterministic such that, when one PDSCH is undetected, a NACK is sent in the corresponding HARQ codebook entry.

In principle, HARQ sub-codebooks for dynamically scheduled PDSCH and SPS PDSCH are constructed separately, and then the two HARQ sub-codebooks are concatenated to provide the (full) HARQ codebook before transmission. In one embodiment, the HARQ-ACK belonging to the sub-codebook for dynamically scheduled PDSCH is placed in front of the HARQ-ACK of the sub-codebook for SPS PDSCH. For example, as shown FIG. 11, assuming scenario 3, dynamically scheduled PDSCH is mapped to the first row and SPS PDSCH is mapped to the second row. Alternatively, the sub-codebook for dynamically scheduled PDSCH can be placed behind the sub-codebooks for SPS PDSCH.

In case two SPS configurations have PDSCHs occurring in a slot, the SPS with smaller SPS configuration index value is mapped to the first row and the one with larger configuration index value is mapped to the second row. Similarly, if there are more than two SPS configurations with PDSCHs in a slot, then the corresponding HARQ-ACK bits of each SPS configuration are mapped to separate rows, where the SPS of increasing configuration indexes map to increasing row indexes in the HARQ-ACK codebook. The multiple DL SPS are each provided with their HARQ-ACK feedback. Since the presence of a SPS PDSCH is known to a UE without PDCCH detection, there is no error case of SPS HARQ-ACK due to missed PDCCH detection.

In case two dynamically scheduled PDSCHs are received in a slot, some rules may be defined such that one PDSCH is mapped to the first row and the other PDSCH is mapped to the second row in a deterministic manner. In one embodiment, RNTI may be used. For example, PDSCH with C-RNTI is mapped to the $1^{st}$ row and CS-RNTI or MCS-RNTI is mapped to the second row. Alternatively, two dynamically scheduled PDSCHs in a slot may not be allowed.

In another embodiment, in case more than two SPS configurations have PDSCH occasions in a slot, only the two PDSCHs with smaller SPS index values are mapped and there is no HARQ ACK feedback for the rest of the SPS PDSCHs. If this happens rarely, the performance degradation should be manageable. This is likely the case in practice where only in rare occasions that more than two SPSs occur in a slot. Thus, in this embodiment, multiple DL SPSs can be supported without increasing HARQ ACK feedback overhead proportionally to the number of DL SPS. Alternatively, the two SPS configurations with lowest configured periodicity will feed back the HARQ-ACK. Others will not, as these may be associated with the service with the lowest latency requirement.

Note the actual codebook consists of a vector of HARQ ACK information bits; the rows and columns shown in the figure are used for illustration only about the association of a codebook entry to a possible PDSCH reception. Also, for simplifying discussion, only overlapping resources in a slot is assumed. Note that if there are two non-overlapping resources that are configured in a slot, two entries are needed for each K1 values, one for each of the non-overlapping resources for J=1 and four entries are need for J=2.

Figure 12:
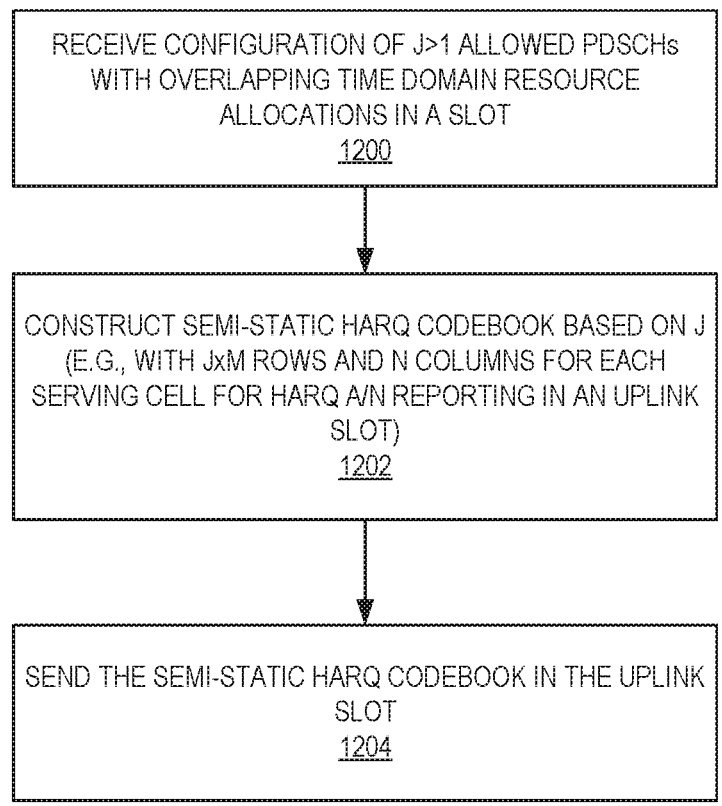
FIG. 12 is a flow chart that illustrates the operation of a UE to receive, from a network node (e.g., a base station), a plurality of DL SPS PDSCHs and send back HARQ A/N feedback associated with the SPS PDSCHs to the network node, according to some embodiments of the present disclosure.

FIG. 12 is a flow chart that illustrates the operation of a UE (e.g., UE 912) to receive, from a network node (e.g., a base station 902), a plurality of DL SPS PDSCHs and send back HARQ A/N feedback associated with the SPS PDSCHs to the network node in accordance with at least some aspects of Embodiment 1 described above. As illustrated, the steps of this process are as follows:

Step 1200: The UE receives a configuration of J>1 allowed PDSCHs with overlapping TDRA in a slot (or sub-slot).

Step 1202: The UE constructs a semi-static HARQ codebook based on the number, J, of allowed PDSCHs with overlapping TDRA in a slot. In some embodiments, the UE constructs the semi-static HARQ codebook with JxM rows and N columns for each serving cell for HARQ A/N reporting in a uplink slot, where M is a number of transport blocks enabled and N is a number of downlink slots associated with the uplink slot for HARQ A/N reporting multiplied by a number of non-overlapping TDRAs in a slot.

Step 1204: The UE sends the semi-static HARQ codebook to the network node in the uplink slot by ordering the HARQ codebook entries in certain order.

In some embodiments, the method further comprises associating the first M rows to dynamically scheduled PDSCH(s) and the rest of the rows to SPS PDSCH(s). In some embodiments, this association of the first M rows to dynamically scheduled PDSCH(s) and the rest of the rows to SPS PDSCH(s) is performed when constructing the semi-static HARQ codebook in step 1202. Thus, in some embodiments, constructing the semi-static HARQ codebook in step 1202 includes associating the first M rows to dynamically scheduled PDSCH(s) and the rest of the rows to SPS PDSCH(s). In some embodiments, the first M rows and the second M rows are associated with PDSCH with different types of RNTIs. For example, one with C-RNTI and the other with SPS-RNTI.

In some embodiments, the method further comprises associating the first M rows in a column to a first SPS PDSCH and the second M rows to a second SPS PDSCH if two SPS PDSCHs are received in a slot. In some embodiments, the first SPS PDSCH has a smallest SPS index and the second SPS PDSCH has a next smallest SPS index. In some embodiments, this association of the first M rows in a column to the first SPS PDSCH and the second M rows to the second SPS PDSCH if two SPS PDSCHs are received in a slot is performed when constructing the semi-static HARQ codebook in step 1202. Thus, in some embodiments, constructing the semi-static HARQ codebook in step 1202 includes associating the first M rows in a column to the first SPS PDSCH and the second M rows to the second SPS PDSCH if two SPS PDSCHs are received in a slot.

In some embodiments, the method further comprises associating the first M rows in a column to a first dynamically scheduled PDSCH and the second M rows to a second dynamically scheduled PDSCH if two dynamically scheduled PDSCHs are received in a slot. In some embodiments, the first and the second PDSCHs have different RNTIs. In some embodiments, this association of the first M rows in a column to a first dynamically scheduled PDSCH and the second M rows to a second dynamically scheduled PDSCH if two dynamically scheduled PDSCHs are received in a slot is performed when constructing the semi-static HARQ codebook in step 1202. Thus, in some embodiments, constructing the semi-static HARQ codebook in step 1202 includes associating the first M rows in a column to a first dynamically scheduled PDSCH and the second M rows to a second dynamically scheduled PDSCH if two dynamically scheduled PDSCHs are received in a slot.

In some embodiments, when constructing the semi-static HARQ codebook in step 1202, the UE constructs separate HARQ sub-codebooks for dynamically scheduled PDSCHs and SPS PDSCHs and then combines (e.g., concatenates) these sub-codebooks to provide the semi-static HARQ codebook for transmission back to the network node.

In some embodiments, in case of SPS PDSCH transmission over multiple Transmission Reception Points (TRPs), HARQ bits in the semi-static HARQ codebook are ordered in either TRP first and then serving cells or serving cell first and then TRPs.

Embodiment 2: Dynamic (Type 2) HARQ codebook: The main issue for the Type 2 HARQ codebook is how to order multiple HARQ ACK bits associated with multiple SPS. In one embodiment, the Rel-15 Type 2 HARQ codebook can be extended by adding the multiple HARQ ACK bits corresponding to the DL SPS PDSCHs to the end of the HARQ ACK bits, $\tilde{o}_0^{ACK}, \tilde{o}_1^{ACK}, \ldots, \tilde{o}_{o^{ACK}-1}^{ACK}$, associated with dynamically scheduled PDSCHs. The ordering of these multiple HARQ ACK bits can be in ascending order of DL-SPS configuration index first, and in ascending order of serving cell index next. Note that this embodiment is also applicable even if other ways of ordering is also considered (for example, descending ordering, or serving cell index ordering first and DL-SPS configuration index ordering next).

More specifically, the following pseudo code may be used to add HARQ ACK bits associated with SPS PDSCHs to the HARQ ACK bits $\tilde{o}_0^{ACK}, \tilde{o}_1^{ACK}, \ldots, \tilde{o}_{o^{ACK}-1}^{ACK}$ to be sent in a PUCCH resource in UL slot n:

```
Set c = 0
While c < N_cells^DL
    Set j=0
    While j<M_SPS,c
        if SPS PDSCH reception of j-th SPS configuration is activated for a
        UE and the UE is configured to receive SPS PDSCH in slot {n −
        K_1,c(j)} for serving cell c, where K_1,c(j) is the PDSCH-to-HARQ-
        feedback timing value for the j-th SPS PDSCH on serving cell c,
```

```
        Update the total number of HARQ information bits: $O^{ACK}$ =
        $O^{ACK}$ + 1
        Update the HARQ ACK information bits by adding HARQ-ACK
        information bit associated with the $j^{th}$ SPS PDSCH reception
        at the end of the HARQ ACK information bits
      end if
    end while
    c = c + 1;
  end while
``` where $N_{cells}^{DL}$ is the total number of DL serving cells configured to the UE. Here j refers to the index of DL-SPS configuration, j=1, . . . , $M_{SPS,c}$.

In the above pseudo-code, it was assumed that there is at most one PDSCH reception in slot $n-K_{1,c}(i)$ for the i-th DL-SPS configuration that its A/N is to be sent in uplink slot n, which is the case when periodicity of the i-th DL-SPS is greater than or equal to 1 slot, and the same SCS is used in DL carrier and UL carrier. If the periodicity of the DL-SPS is shorter than 1 slot, or the DL SCS is greater than the UL SCS, then there are multiple HARQ-ACK bits for PDSCH reception in slot $n-K_{1,c}(i)$ for the i-th DL-SPS configuration. In this case, the pseudo-code can be extended by arranging the HARQ-ACK bits sequentially according to increasing time of PDSCH reception in slot $n-K_{1,c}(i)$ for the i-th DL-SPS configuration.

Let us consider the case with the $j^{th}$ activated DL-SPS configuration which has a periodicity of $(1/Z_{j,C})$'h of a slot where $Z_{j,C}$ is an integer. In this case, there are $Z_{j,C}$ HARQ-ACK bits for PDSCH reception in slot $n-K_{1,c}(j)$ for the $j^{th}$ activated DL-SPS configuration. In one embodiment, the Rel-15 Type 2 HARQ codebook can be extended by adding the multiple HARQ ACK bits corresponding to the DL SPS PDSCHs to the end of the HARQ ACK bits, $\tilde{o}_0^{ACK}$, $\tilde{o}_1^{ACK}$, . . . , $\tilde{o}_{o^{ACK}-1}^{ACK}$, associated with dynamically scheduled PDSCHs in ascending order of the DL-SPS period within a slot (e.g., in the order $1^{st}$ DL-SPS PDSCH period within a slot, $2^{nd}$ DL-SPS PDSCH period within a slot, . . . , $Z_{j,C}^{th}$ DL-SPS PDSCH period within a slot), in ascending order of DL-SPS configuration index j, and in ascending ordering of serving cell index. Note that this embodiment is also applicable even if other ways of ordering are also considered (for example, descending ordering, or any ordering involving DL-SPS PDSCH period within a slot, serving cell index ordering and DL-SPS configuration index ordering).

More specifically, the following pseudo code may be used to add HARQ ACK bits associated with SPS PDSCHs to the HARQ ACK bits $\tilde{o}_0^{ACK}$, $\tilde{o}_1^{ACK}$, . . . , $\tilde{o}_{o^{ACK}-1}^{ACK}$ to be sent in a PUCCH resource in UL slot n:

```
Set c = 0
While c < $N_{cells}^{DL}$
  Set j=0
  While j<$M_{SPS,c}$
    if SPS PDSCH reception of j-th SPS configuration is activated for a
    UE and the UE is configured to receive SPS PDSCH with a
    periodicity of $(1/Z_{j,c})^{th}$ of a slot where $Z_{j,c}$ is an integer in slot
    {n – $K_{1,c}(j)$} for serving cell c, where $K_{1,c}(j)$ is the PDSCH-to-
    HARQ-feedback timing value, counted from the end of slot {n –
    $K_{1,c}(j)$} for the $j^{th}$ SPS PDSCH configuration on serving cell c,
      While z < $Z_{j,c}$
        Update the total number of HARQ information bits:
        $O_{ACK}$ = $O_{ACK}$ + 1
        Update the HARQ ACK information bits with HARQ-
        ACK information bit associated with the $z^{th}$ SPS PDSCH
        period within slot {n $K_{1,c}(j)$} of the $j^{th}$ SPS PDSCH
        reception
      end while
    end if
  end while
  c = c + 1;
end while
``` where $N_{cells}^{DL}$ is the total number of DL serving cells configured to the UE. Here j refers to the index of DL-SPS configuration, j=1, . . . , $M_{SPS,c}$, and z refers to the SPS PDSCH period within slot {$n-K_{1,c}(j)$}.

Figure 13:
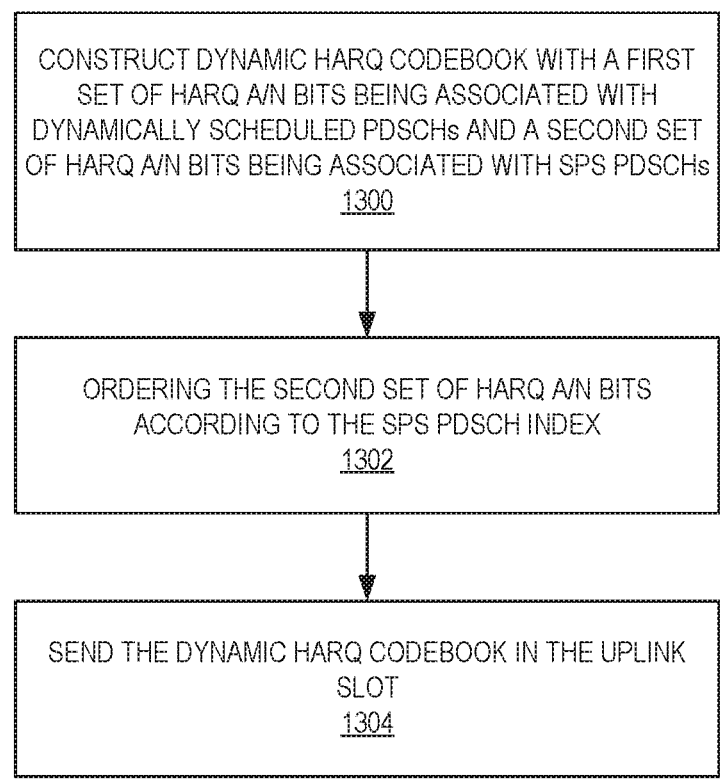
FIG. 13 is a flow chart that illustrates the operation of a UE to receive, from a network node (e.g., a base station), a plurality of downlink SPS PDSCHs, each with a SPS configuration index, and send back HARQ A/N feedback associated with the SPS PDSCHs to the network node, according to some embodiments of the present disclosure.

FIG. 13 is a flow chart that illustrates the operation of a UE (e.g., UE 912) to receive, from a network node (e.g., a base station 902), a plurality of downlink SPS PDSCHs, each with a SPS configuration index, and send back HARQ A/N feedback associated with the SPS PDSCHs to the network node, in accordance with at least some aspects of Embodiment 2 described above. As illustrated, the process includes the following steps:

Step 1300: The UE constructs a dynamic HARQ codebook with a first set of HARQ A/N bits being associated with dynamically scheduled PDSCHs and a second set of HARQ A/N bits being associated with SPS PDSCHs.

Step 1302: The UE orders the second set of HARQ A/N bits according to the SPS PDSCH index in either ascending or descending order. Note that, in some embodiments, step 1302 may be implemented as part of step 1300.

Step 1304: The UE sends the HARQ codebook to a network node in an uplink slot.

In some embodiments, in case of SPS PDSCH transmission over multiple TRPs, the HARQ bits can be ordered in either TRP first and then serving cells or serving cell first and TRPs.

In some embodiments, for the type 1 HARQ codebook, the proposed solution includes of allowing J>1 PDSCHs in a slot with overlapping time domain resource allocations and allocating J times of HARQ codebook entries for each K1 comparing to NR Rel-15 HARQ codebook, with separate entries or rows defined in the codebook for DL SPS.

In some embodiments, for the Type 2 HARQ codebook, a method is proposed to order the HARQ A/N bits for DL SPS based on the DL SPS configuration index in either ascending or descending order and multiplexed with the HARQ A/N bits for dynamically scheduled PDSCHs for each serving cell.

HARQ codebook construction when multiple-TRP: In case of multi-TRP with SPS, there are several possible ways to transmit SPS PDSCH. One implementation of multi-TRP is to use the carrier aggregation framework where e.g., two serving cell objects are configured with the same carrier frequency. Hence, these represent TRP1 and TRP2 respectively.

In one option, all active SPS configurations are sent over one TRP. The selected TRP can be indicated in the TCI field of the activation DCI, or configured via RRC signaling. The indication of a TRP can be implicit, as the ServingCell with the lowest ID is in one example how to indicate implicitly which TRP is transmitting the SPS configurations.

In another option, one subset of active SPS configurations are sent over one TRP, and another subset of active SPS configurations are sent over a different TRP. For each of the j-th DL SPS configuration, the selected TRP can be indicated in the TCI field of the j-th activation DCI, or provided via RRC signaling of the j-th SPS configuration.

In another option, for a single SPS, its PDSCH may be sent over different TRPs, using either Spatial Division Multiplexing (SDM), Frequency Division Multiplexing (FDM), or Time Division Multiplexing (TDM) approach or a combination of SDM/FDM/TDM. The TRPs can be indicated in the TCI field of the activation DCI, similar to dynamic scheduling.

When there are multiple TRP in network node, the HARQ-ACK feedback can be sent separately for each TRP. Alternatively, the HARQ-ACK feedback for two or more TRPs can be sent jointly.

In case of separate feedback, one HARQ-ACK codebook is generated for each TRP separately. The individual HARQ-ACK codebooks for the multiple TRP are sent in TDM manner, i.e., without overlapping in time. The HARQ-ACK codebooks are sent via separate PUCCH and/or PUSCH.

In case of joint feedback, HARQ-ACK feedback for two or more TRPs is aggregated. The aggregated HARQ-ACK bits are sent in one PUCCH resource, or multiplexed onto one PUSCH. Two examples of aggregating the HARQ-ACK bits are shown in FIG. 14 and FIG. 15. In particular, FIG. 14 illustrates an example of aggregated HARQ-ACK for two TRPs and two cells, where HARQ-ACK bits of one cell are grouped together. FIG. 15 illustrates an example of aggregated HARQ-ACK for two TRPs and two cells, where HARQ-ACK bits of one TRP is grouped together.

Figure 16:
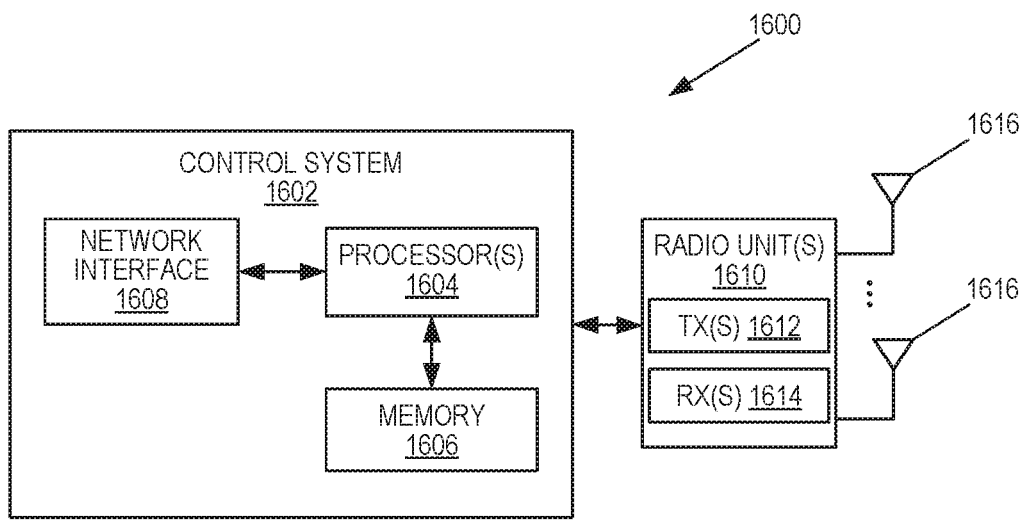
FIG. 16 is a schematic block diagram of a radio access node, according to some embodiments of the present disclosure.

FIG. 16 is a schematic block diagram of a radio access node 1600 according to some embodiments of the present disclosure. The radio access node 1600 may be, for example, a base station 902 or 906. As illustrated, the radio access node 1600 includes a control system 1602 that includes one or more processors 1604 (e.g., Central Processing Units (CPUs), Application Specific Integrated Circuits (ASICs), Field Programmable Gate Arrays (FPGAs), and/or the like), memory 1606, and a network interface 1608. The one or more processors 1604 are also referred to herein as processing circuitry. In addition, the radio access node 1600 includes one or more radio units 1610 that each includes one or more transmitters 1612 and one or more receivers 1614 coupled to one or more antennas 1616. The radio units 1610 may be referred to or be part of radio interface circuitry. In some embodiments, the radio unit(s) 1610 is external to the control system 1602 and connected to the control system 1602 via, e.g., a wired connection (e.g., an optical cable). However, in some other embodiments, the radio unit(s) 1610 and potentially the antenna(s) 1616 are integrated together with the control system 1602. The one or more processors 1604 operate to provide one or more functions of a radio access node 1600 as described herein. In some embodiments, the function(s) are implemented in software that is stored, e.g., in the memory 1606 and executed by the one or more processors 1604.

Figure 17:
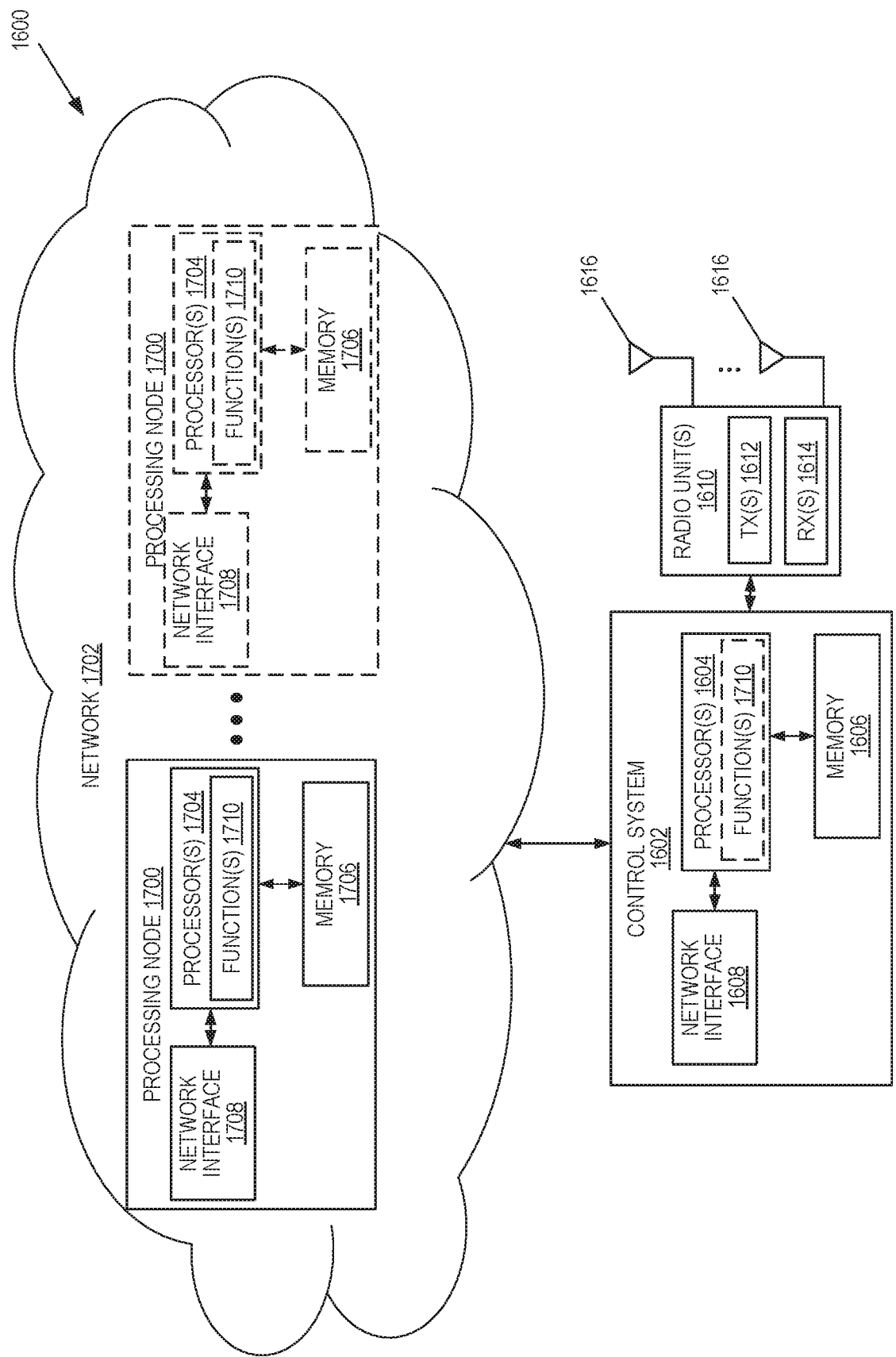
FIG. 17 is a schematic block diagram that illustrates a virtualized embodiment of the radio access node, according to some embodiments of the present disclosure.

FIG. 17 is a schematic block diagram that illustrates a virtualized embodiment of the radio access node 1600 according to some embodiments of the present disclosure. This discussion is equally applicable to other types of network nodes. Further, other types of network nodes may have similar virtualized architectures.

As used herein, a "virtualized" radio access node is an implementation of the radio access node 1600 in which at least a portion of the functionality of the radio access node 1600 is implemented as a virtual component(s) (e.g., via a virtual machine(s) executing on a physical processing node(s) in a network(s)). As illustrated, in this example, the radio access node 1600 includes the control system 1602 that includes the one or more processors 1604 (e.g., CPUs, ASICs, FPGAs, and/or the like), the memory 1606, and the network interface 1608 and the one or more radio units 1610 that each includes the one or more transmitters 1612 and the one or more receivers 1614 coupled to the one or more antennas 1616, as described above. The control system 1602 is connected to the radio unit(s) 1610 via, for example, an optical cable or the like. The control system 1602 is connected to one or more processing nodes 1700 coupled to or included as part of a network(s) 1702 via the network interface 1608. Each processing node 1700 includes one or more processors 1704 (e.g., CPUs, ASICs, FPGAs, and/or the like), memory 1706, and a network interface 1708.

In this example, functions 1710 of the radio access node 1600 described herein are implemented at the one or more processing nodes 1700 or distributed across the control system 1602 and the one or more processing nodes 1700 in any desired manner. In some particular embodiments, some or all of the functions 1710 of the radio access node 1600 described herein are implemented as virtual components executed by one or more virtual machines implemented in a virtual environment(s) hosted by the processing node(s) 1700. As will be appreciated by one of ordinary skill in the art, additional signaling or communication between the processing node(s) 1700 and the control system 1602 is used in order to carry out at least some of the desired functions 1710. Notably, in some embodiments, the control system 1602 may not be included, in which case the radio unit(s) 1610 communicate directly with the processing node(s) 1700 via an appropriate network interface(s).

In some embodiments, a computer program including instructions which, when executed by at least one processor, causes the at least one processor to carry out the functionality of radio access node 1600 or a node (e.g., a processing node 1700) implementing one or more of the functions 1710 of the radio access node 1600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
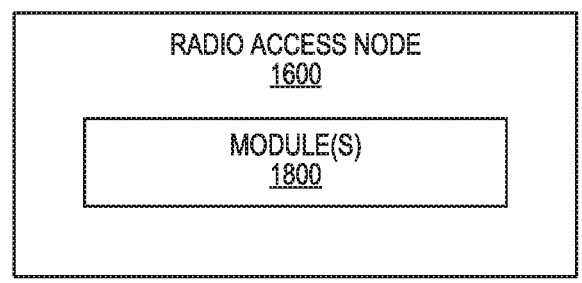
FIG. 18 is a schematic block diagram of the radio access node, according to some other embodiments of the present disclosure.

FIG. 18 is a schematic block diagram of the radio access node 1600 according to some other embodiments of the present disclosure. The radio access node 1600 includes one or more modules 1800, each of which is implemented in software. The module(s) 1800 provide the functionality of the radio access node 1600 described herein. This discussion is equally applicable to the processing node 1700 of FIG. 17 where the modules 1800 may be implemented at one of the processing nodes 1700 or distributed across multiple processing nodes 1700 and/or distributed across the processing node(s) 1700 and the control system 1602.

Figure 19:
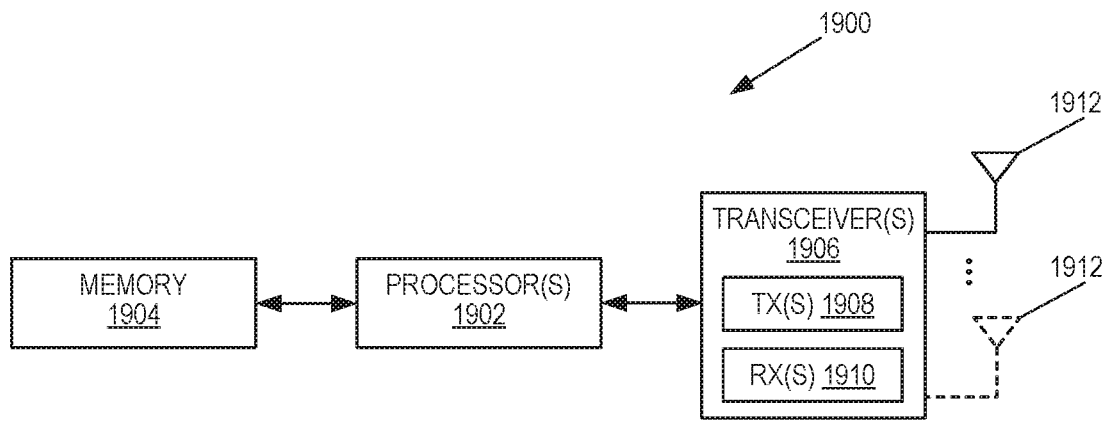
FIG. 19 is a schematic block diagram of a UE, according to some embodiments of the present disclosure.

FIG. 19 is a schematic block diagram of a UE 1900 according to some embodiments of the present disclosure. As illustrated, the UE 1900 includes one or more processors 1902 (e.g., CPUs, ASICs, FPGAs, and/or the like), memory 1904, and one or more transceivers 1906 each including one or more transmitters 1908 and one or more receivers 1910 coupled to one or more antennas 1912. The transceiver(s) 1906 includes radio-front end circuitry connected to the antenna(s) 1912 that is configured to condition signals communicated between the antenna(s) 1912 and the processor(s) 1902, as will be appreciated by on of ordinary skill in the art. The processors 1902 are also referred to herein as processing circuitry. The transceivers 1906 are also referred to herein as radio circuitry. In some embodiments, the functionality of the UE 1900 described above (e.g., the functionality of the UE described above, e.g., with respect to FIGS. 12 and 13) may be fully or partially implemented in software that is, e.g., stored in the memory 1904 and executed by the processor(s) 1902. Note that the UE 1900 may include additional components not illustrated in FIG. 19 such as, e.g., one or more user interface components (e.g., an input/output interface including a display, buttons, a touch screen, a microphone, a speaker(s), and/or the like and/or any other components for allowing input of information into the UE 1900 and/or allowing output of information from the UE 1900), a power supply (e.g., a battery and associated power circuitry), etc.

In some embodiments, a computer program including instructions which, when executed by at least one processor, causes the at least one processor to carry out the functionality of the UE 1900 according to any of the embodiments described herein (e.g., the functionality of the UE described above, e.g., with respect to FIGS. 12 and 13) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
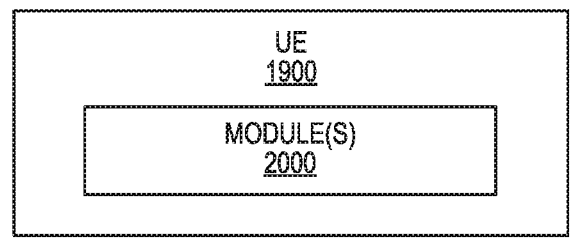
FIG. 20 is a schematic block diagram of the UE, according to some embodiments of the present disclosure.

FIG. 20 is a schematic block diagram of the UE 1900 according to some other embodiments of the present disclosure. The UE 1900 includes one or more modules 2000, each of which is implemented in software. The module(s) 2000 provide the functionality of the UE 1900 described herein (e.g., the functionality of the UE described above, e.g., with respect to FIGS. 12 and 13).

Figure 21:
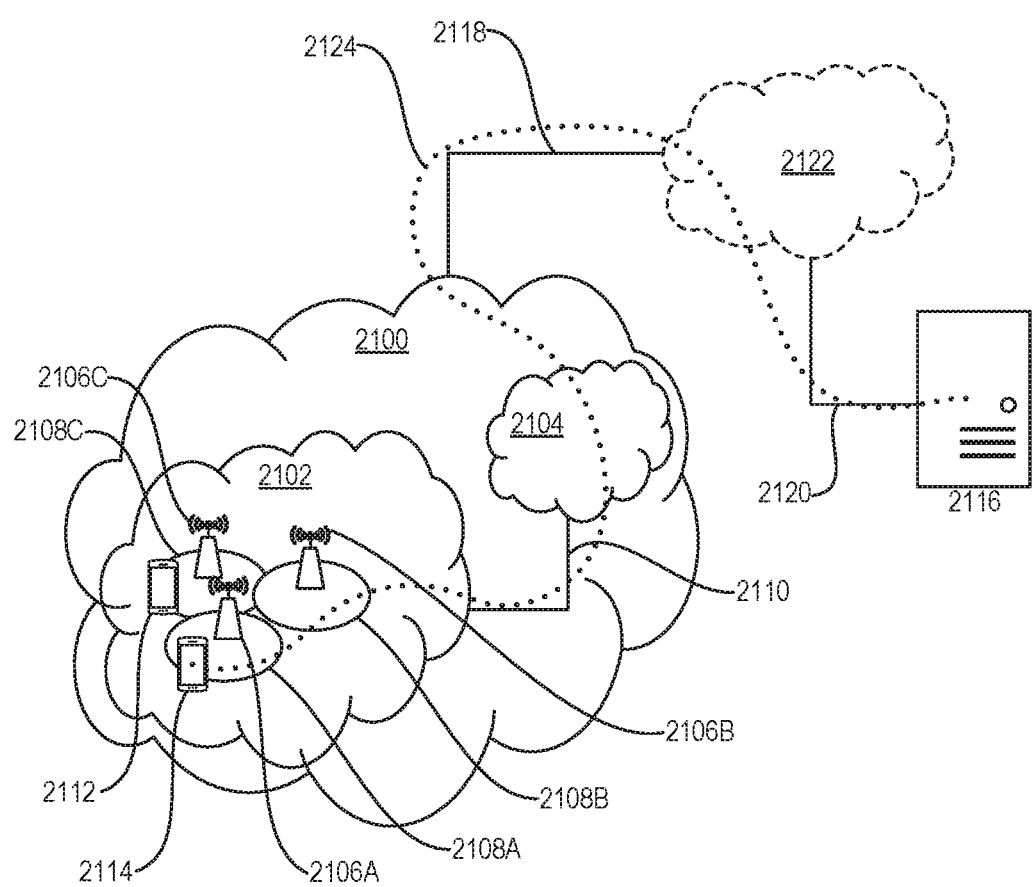
FIGS. 21 and 22 illustrate examples of a cellular communications system, according to some embodiments of the present disclosure.

With reference to FIG. 21, in accordance with an embodiment, a communication system includes a telecommunication network 2100, such as a 3GPP-type cellular network, which comprises an access network 2102, such as a RAN, and a core network 2104. The access network 2102 comprises a plurality of base stations 2106A, 2106B, 2106C, such as Node Bs, eNBs, gNBs, or other types of wireless Access Points (APs), each defining a corresponding coverage area 2108A, 2108B, 2108C. Each base station 2106A, 2106B, 2106C is connectable to the core network 2104 over a wired or wireless connection 2110. A first UE 2112 located in coverage area 2108C is configured to wirelessly connect to, or be paged by, the corresponding base station 2106C. A second UE 2114 in coverage area 2108A is wirelessly connectable to the corresponding base station 2106A. While a plurality of UEs 2112, 2114 are illustrated in this example, the disclosed embodiments are equally applicable to a situation where a sole UE is in the coverage area or where a sole UE is connecting to the corresponding base station 2106.

The telecommunication network 2100 is itself connected to a host computer 2116, which may be embodied in the hardware and/or software of a standalone server, a cloud-implemented server, a distributed server, or as processing resources in a server farm. The host computer 2116 may be under the ownership or control of a service provider, or may be operated by the service provider or on behalf of the service provider. Connections 2118 and 2120 between the telecommunication network 2100 and the host computer 2116 may extend directly from the core network 2104 to the host computer 2116 or may go via an optional intermediate network 2122. The intermediate network 2122 may be one of, or a combination of more than one of, a public, private, or hosted network; the intermediate network 2122, if any, may be a backbone network or the Internet; in particular, the intermediate network 2122 may comprise two or more sub-networks (not shown).

The communication system of FIG. 21 as a whole enables connectivity between the connected UEs 2112, 2114 and the host computer 2116. The connectivity may be described as an Over-the-Top (OTT) connection 2124. The host computer 2116 and the connected UEs 2112, 2114 are configured to communicate data and/or signaling via the OTT connection 2124, using the access network 2102, the core network 2104, any intermediate network 2122, and possible further infrastructure (not shown) as intermediaries. The OTT connection 2124 may be transparent in the sense that the participating communication devices through which the OTT connection 2124 passes are unaware of routing of uplink and downlink communications. For example, the base station 2106 may not or need not be informed about the past routing of an incoming downlink communication with data originating from the host computer 2116 to be forwarded (e.g., handed over) to a connected UE 2112. Similarly, the base station 2106 need not be aware of the future routing of an outgoing uplink communication originating from the UE 2112 towards the host computer 2116.

Example implementations, in accordance with an embodiment, of the UE, base station, and host computer discussed in the preceding paragraphs will now be described with reference to FIG. 22. In a communication system 2200, a host computer 2202 comprises hardware 2204 including a communication interface 2206 configured to set up and maintain a wired or wireless connection with an interface of a different communication device of the communication system 2200. The host computer 2202 further comprises processing circuitry 2208, which may have storage and/or processing capabilities. In particular, the processing circuitry 2208 may comprise one or more programmable processors, ASICs, FPGAs, or combinations of these (not shown) adapted to execute instructions. The host computer 2202 further comprises software 2210, which is stored in or accessible by the host computer 2202 and executable by the processing circuitry 2208. The software 2210 includes a host application 2212. The host application 2212 may be operable to provide a service to a remote user, such as a UE 2214 connecting via an OTT connection 2216 terminating at the UE 2214 and the host computer 2202. In providing the service to the remote user, the host application 2212 may provide user data which is transmitted using the OTT connection 2216.

The communication system 2200 further includes a base station 2218 provided in a telecommunication system and comprising hardware 2220 enabling it to communicate with the host computer 2202 and with the UE 2214. The hardware 2220 may include a communication interface 2222 for setting up and maintaining a wired or wireless connection with an interface of a different communication device of the communication system 2200, as well as a radio interface

2224 for setting up and maintaining at least a wireless connection 2226 with the UE 2214 located in a coverage area (not shown in FIG. 22) served by the base station 2218. The communication interface 2222 may be configured to facilitate a connection 2228 to the host computer 2202. The connection 2228 may be direct or it may pass through a core network (not shown in FIG. 22) of the telecommunication system and/or through one or more intermediate networks outside the telecommunication system. In the embodiment shown, the hardware 2220 of the base station 2218 further includes processing circuitry 2230, which may comprise one or more programmable processors, ASICs, FPGAs, or combinations of these (not shown) adapted to execute instructions. The base station 2218 further has software 2232 stored internally or accessible via an external connection.

The communication system 2200 further includes the UE 2214 already referred to. The UE's 2214 hardware 2234 may include a radio interface 2236 configured to set up and maintain a wireless connection 2226 with a base station serving a coverage area in which the UE 2214 is currently located. The hardware 2234 of the UE 2214 further includes processing circuitry 2238, which may comprise one or more programmable processors, ASICs, FPGAs, or combinations of these (not shown) adapted to execute instructions. The UE 2214 further comprises software 2240, which is stored in or accessible by the UE 2214 and executable by the processing circuitry 2238. The software 2240 includes a client application 2242. The client application 2242 may be operable to provide a service to a human or non-human user via the UE 2214, with the support of the host computer 2202. In the host computer 2202, the executing host application 2212 may communicate with the executing client application 2242 via the OTT connection 2216 terminating at the UE 2214 and the host computer 2202. In providing the service to the user, the client application 2242 may receive request data from the host application 2212 and provide user data in response to the request data. The OTT connection 2216 may transfer both the request data and the user data. The client application 2242 may interact with the user to generate the user data that it provides.

Figure 22:
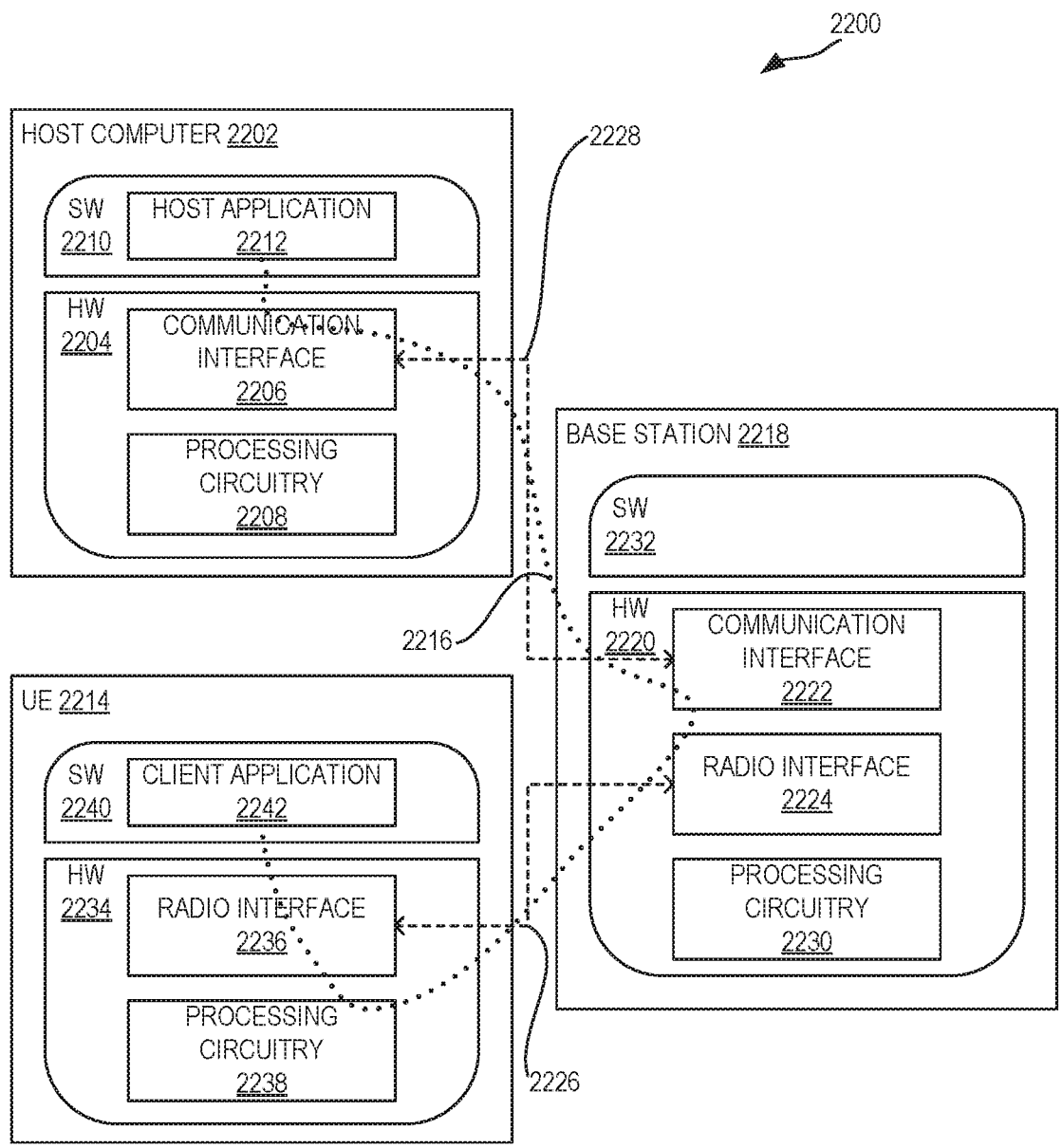

It is noted that the host computer 2202, the base station 2218, and the UE 2214 illustrated in FIG. 22 may be similar or identical to the host computer 2116, one of the base stations 2106A, 2106B, 2106C, and one of the UEs 2112, 2114 of FIG. 21, respectively. This is to say, the inner workings of these entities may be as shown in FIG. 22 and independently, the surrounding network topology may be that of FIG. 21.

In FIG. 22, the OTT connection 2216 has been drawn abstractly to illustrate the communication between the host computer 2202 and the UE 2214 via the base station 2218 without explicit reference to any intermediary devices and the precise routing of messages via these devices. The network infrastructure may determine the routing, which may be configured to hide from the UE 2214 or from the service provider operating the host computer 2202, or both. While the OTT connection 2216 is active, the network infrastructure may further take decisions by which it dynamically changes the routing (e.g., on the basis of load balancing consideration or reconfiguration of the network).

The wireless connection 2226 between the UE 2214 and the base station 2218 is in accordance with the teachings of the embodiments described throughout this disclosure. One or more of the various embodiments improve the performance of OTT services provided to the UE 2214 using the OTT connection 2216, in which the wireless connection 2226 forms the last segment.

A measurement procedure may be provided for the purpose of monitoring data rate, latency, and other factors on which the one or more embodiments improve. There may further be an optional network functionality for reconfiguring the OTT connection 2216 between the host computer 2202 and the UE 2214, in response to variations in the measurement results. The measurement procedure and/or the network functionality for reconfiguring the OTT connection 2216 may be implemented in the software 2210 and the hardware 2204 of the host computer 2202 or in the software 2240 and the hardware 2234 of the UE 2214, or both. In some embodiments, sensors (not shown) may be deployed in or in association with communication devices through which the OTT connection 2216 passes; the sensors may participate in the measurement procedure by supplying values of the monitored quantities exemplified above, or supplying values of other physical quantities from which the software 2210, 2240 may compute or estimate the monitored quantities. The reconfiguring of the OTT connection 2216 may include message format, retransmission settings, preferred routing, etc.; the reconfiguring need not affect the base station 2218, and it may be unknown or imperceptible to the base station 2218. Such procedures and functionalities may be known and practiced in the art. In certain embodiments, measurements may involve proprietary UE signaling facilitating the host computer 2202's measurements of throughput, propagation times, latency, and the like. The measurements may be implemented in that the software 2210 and 2240 causes messages to be transmitted, in particular empty or 'dummy' messages, using the OTT connection 2216 while it monitors propagation times, errors, etc.

Figures 23, 24:
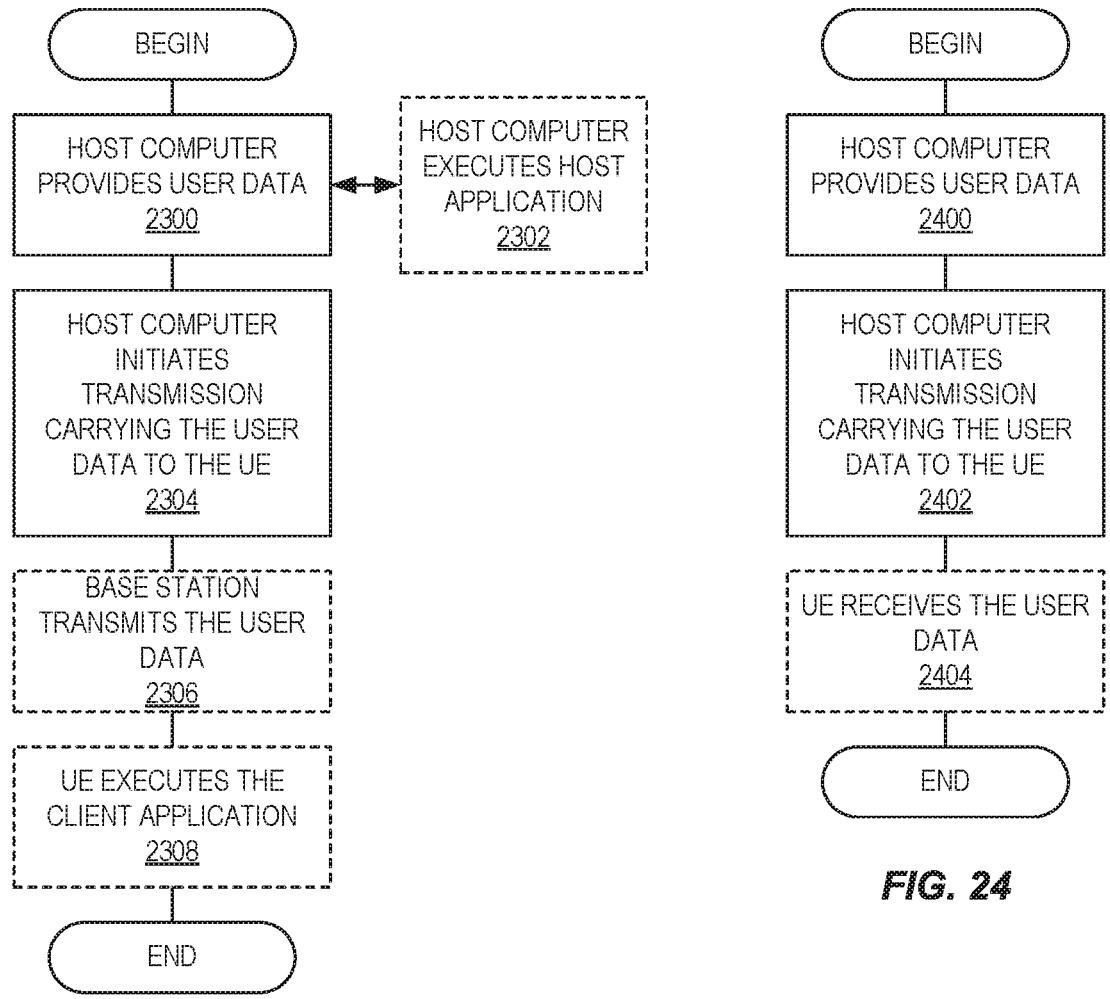

FIG. 23 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 23 will be included in this section. In step 2300, the host computer provides user data. In sub-step 2302 (which may be optional) of step 2300, the host computer provides the user data by executing a host application. In step 2304, the host computer initiates a transmission carrying the user data to the UE. In step 2306 (which may be optional), the base station transmits to the UE the user data which was carried in the transmission that the host computer initiated, in accordance with the teachings of the embodiments described throughout this disclosure. In step 2308 (which may also be optional), the UE executes a client application associated with the host application executed by the host computer.

FIG. 24 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 24 will be included in this section. In step 2400 of the method, the host computer provides user data. In an optional sub-step (not shown) the host computer provides the user data by executing a host application. In step 2402, the host computer initiates a transmission carrying the user data to the UE. The transmission may pass via the base station, in accordance with the teachings of the embodiments described throughout this disclosure. In step 2404 (which may be optional), the UE receives the user data carried in the transmission.

FIG. 25 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 25 will be included in this section. In step 2500 (which may be optional), the UE receives input data provided by the host computer. Additionally or alternatively, in step 2502, the UE provides user data. In sub-step 2504 (which may be optional) of step 2500, the UE provides the user data by executing a client application. In sub-step 2506 (which may be optional) of step 2502, the UE executes a client application which provides the user data in reaction to the received input data provided by the host computer. In providing the user data, the executed client application may further consider user input received from the user. Regardless of the specific manner in which the user data was provided, the UE initiates, in sub-step 2508 (which may be optional), transmission of the user data to the host computer. In step 2510 of the method, the host computer receives the user data transmitted from the UE, in accordance with the teachings of the embodiments described throughout this disclosure.

FIG. 26 is a flowchart illustrating a method implemented in a communication system, in accordance with one embodiment. The communication system includes a host computer, a base station, and a UE which may be those described with reference to FIGS. 21 and 22. For simplicity of the present disclosure, only drawing references to FIG. 26 will be included in this section. In step 2600 (which may be optional), in accordance with the teachings of the embodiments described throughout this disclosure, the base station receives user data from the UE. In step 2602 (which may be optional), the base station initiates transmission of the received user data to the host computer. In step 2604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a UE (912) to receive, from a network node (e.g., a base station 902), a plurality of DL SPS PDSCHs and send back HARQ A/N feedback associated with the SPS PDSCHs to the network node, comprising at least one of: receiving (1200) a configuration of J>1 allowed PDSCHs with overlapping time domain resource allocations in a slot or sub-slot; constructing (1202) a semi-static HARQ codebook for HARQ A/N reporting based on the number, J, of allowed PDSCHs with overlapping time domain resource allocations in a slot or sub-slot; and sending (1204) the semi-static HARQ codebook to the network node in an uplink slot or sub-slot.

Embodiment 2: The method of embodiment 1 wherein sending (1204) the semi-static HARQ codebook to the network node in the uplink slot or sub-slot comprises sending (1204) the semi-static HARQ codebook to the network node in the uplink slot or sub-slot, such as by ordering the HARQ codebook entries in certain order.

Embodiment 3: The method of embodiment 1 or 2 wherein constructing (1202) the semi-static HARQ codebook comprises constructing (1202) the semi-static HARQ codebook with J×M rows and N columns for each serving cell for HARQ A/N reporting in the uplink slot or sub-slot, where M is a number of transport blocks enabled and N is a number of downlink slots or sub-slots associated with the uplink slot or sub-slot for HARQ A/N reporting multiplied by a number of non-overlapping time domain resource allocations in a slot or sub-slot.

Embodiment 4: The method of embodiment 3 further comprising associating the first M rows to dynamically scheduled PDSCH(s) and the rest of the rows to SPS PDSCH(s).

Embodiment 5: The method of embodiment 3 wherein constructing (1202) the semi-static HARQ codebook comprises associating the first M rows to dynamically scheduled PDSCH(s) and the rest of the rows to SPS PDSCH(s).

Embodiment 6: The method of embodiment 3 further comprising associating the first M rows in a column to a first SPS PDSCH and the second M rows to a second SPS PDSCH if two SPS PDSCHs are received in a slot or sub-slot.

Embodiment 7: The method of embodiment 6 wherein the first SPS PDSCH has a smallest SPS index and the second SPS PDSCH has a next smallest SPS index.

Embodiment 8: The method of embodiment 3 wherein constructing (1202) the semi-static HARQ codebook comprises associating the first M rows in a column to the first SPS PDSCH and the second M rows to the second SPS PDSCH if two SPS PDSCHs are received in a slot or sub-slot.

Embodiment 9: The method of embodiment 3 further comprising associating the first M rows in a column to a first dynamically scheduled PDSCH and the second M rows to a second dynamically scheduled PDSCH if two dynamically scheduled PDSCHs are received in a slot or sub-slot.

Embodiment 10: The method of embodiment 9 wherein the first and the second SPS PDSCH have different RNTI.

Embodiment 11: The method of embodiment 3 wherein constructing (1202) the semi-static HARQ codebook comprises associating the first M rows in a column to a first dynamically scheduled PDSCH and the second M rows to a second dynamically scheduled PDSCH if two dynamically scheduled PDSCHs are received in a slot or sub-slot.

Embodiment 12: The method of any one of embodiments 1 to 3 wherein constructing (1202) the semi-static HARQ codebook comprises at least one of: constructing separate HARQ sub-codebooks for dynamically scheduled PDSCHs and SPS PDSCHs; and combining (e.g., concatenating) the separate HARQ sub-codebooks to provide the semi-static HARQ codebook.

Embodiment 13: The method of any one of embodiments 1 to 12 wherein, for SPS PDSCH transmission over multiple transmission points (TRPs), HARQ bits in the semi-static HARQ codebook are ordered in either TRP first and then serving cells or serving cell first and then TRPs.

Embodiment 14: A method performed by a UE (912) to receive, from a network node (e.g., a base station 902), a plurality of downlink SPS PDSCHs, each with a SPS configuration index, and send back HARQ A/N feedback associated with the SPS PDSCHs to the network node, comprising at least one of: constructing (1300) a dynamic HARQ codebook with a first set of HARQ A/N bits being associated with dynamically scheduled PDSCHs and a second set of HARQ A/N bits being associated with SPS PDSCHs; ordering (1302) the second set of HARQ A/N bits according to the SPS PDSCH index in either ascending or descending order; and sending (1304) the HARQ codebook to a network node in an uplink slot or sub-slot.

Embodiment 15: The method of embodiment 14 wherein, for SPS PDSCH transmission over multiple transmission points (TRPs), HARQ bits in the semi-static HARQ codebook are ordered in either TRP first and then serving cells or serving cell first and then TRPs.

Embodiment 16: The method of any of the previous embodiments, further comprising: providing user data; and forwarding the user data to a host computer via the transmission to the base station.

Group B Embodiments

Embodiment 17: A wireless device comprising:—processing circuitry configured to perform any of the steps of any of the Group A embodiments; and—power supply circuitry configured to supply power to the wireless device.

Embodiment 18: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 19: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 20: The communication system of the previous embodiment, wherein the cellular network further includes a base station configured to communicate with the UE.

Embodiment 21: The communication system of the previous 2 embodiments, wherein: the processing circuitry of the host computer is configured to execute a host application, thereby providing the user data; and the UE's processing circuitry is configured to execute a client application associated with the host application.

Embodiment 22: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 23: The method of the previous embodiment, further comprising at the UE, receiving the user data from the base station.

Embodiment 24: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 25: The communication system of the previous embodiment, further including the UE.

Embodiment 26: The communication system of the previous 2 embodiments, further including the base station, wherein the base station comprises a radio interface configured to communicate with the UE and a communication interface configured to forward to the host computer the user data carried by a transmission from the UE to the base station.

Embodiment 27: The communication system of the previous 3 embodiments, wherein: the processing circuitry of the host computer is configured to execute a host application; and the UE's processing circuitry is configured to execute a client application associated with the host application, thereby providing the user data.

Embodiment 28: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 29: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 30: The method of the previous embodiment, further comprising, at the UE, providing the user data to the base station.

Embodiment 31: The method of the previous 2 embodiments, further comprising: at the UE, executing a client application, thereby providing the user data to be transmitted; and at the host computer, executing a host application associated with the client application.

Embodiment 32: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 33: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 34: The method of the previous embodiment, further comprising at the base station, receiving the user data from the UE.

Embodiment 35: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
AF Application Function
AMF Access and Mobility Function
AN Access Network
AP Access Point
ASIC Application Specific Integrated Circuit
AUSF Authentication Server Function
BWP Bandwidth Part
CA Carrier Aggregation
CB Codebook
CBG Code Block Group
CC Component Carrier
CCE Control Channel Element
CORESET Control Resource Set
CP-OFDM Cyclic Prefix Orthogonal Frequency Division Multiplexing
CPU Central Processing Unit
CRC Cyclic Redundancy Check
C-RNTI Cell Radio Network Temporary Identifier
CSI Channel State Information
CSI-RS Channel State Information Reference Signal
CS-RNTI Configured Scheduling Radio Network Temporary Identifier
CSS Common Search Space
DAI Downlink Assignment Index
DCI Downlink Channel Information
DFT Discrete Fourier Transform
DMRS Demodulation Reference Signal
DN Data Network
DSP Digital Signal Processor
eNB Enhanced or Evolved Node B
FDM Frequency Division Multiplexing
FPGA Field Programmable Gate Array
GHz Gigahertz
gNB New Radio Base Station
HARQ Hybrid Automatic Repeat Request
HSS Home Subscriber Server
IE Information Element
IIoT Industrial Internet of Things
IoT Internet of Things
IP Internet Protocol
LTE Long Term Evolution
MCS Modulation and Coding Scheme
MCS-C-RNTI MCS Cell Radio Network Temporary Identifier
MIMO Multiple Input Multiple Output
MME Mobility Management Entity
ms Millisecond
MTC Machine Type Communication
NDI New Data Indicator
NEF Network Exposure Function
NF Network Function
NR New Radio
NRF Network Function Repository Function
NSSF Network Slice Selection Function
OFDM Orthogonal Frequency Division Multiplexing
OTT Over-the-Top
PCF Policy Control Function
PDCCH Physical Downlink Control Channel
PDSCH Physical Downlink Shared Channel
PGW Packet Data Network Gateway
PRI PUCCH Resource Indicator
PUCCH Physical Uplink Control Channel
PUSCH Physical Uplink Shared Channel
QCL Quasi Co-Located
QoS Quality of Service
RAM Random Access Memory
RAN Radio Access Network
RB Resource Block
RE Resource Element
REG Resource Element Group
RNTI Radio Network Temporary Identifier
ROM Read Only Memory
RRC Radio Resource Control
RRH Remote Radio Head
RTT Round Trip Time
SCEF Service Capability Exposure Function
SCell Secondary Cell
SDM Spatial Division Multiplexing
SMF Session Management Function
SPS Semi-Persistent Scheduling
SSB Synchronization Signal Block
TB Transport Block
TCI Transmission Configuration Indication
TDD Time Division Duplexing
TDM Time Division Multiplexing
TDRA Time Domain Resource Assignment
TRP Transmission Reception Point
UDM Unified Data Management
UE User Equipment
UPF User Plane Function
USS UE Specific Search Space Those skilled in the art will recognize improvements and modifications to the embodiments of the present disclosure. All such improvements and modifications are considered within the scope of the concepts disclosed herein.

What is claimed is:

1. A method performed by a User Equipment, UE, comprising:
constructing a dynamic Hybrid Automatic Repeat Request, HARQ, codebook with a first set of HARQ Acknowledgement, ACK, bits being associated with one or more dynamically scheduled Physical Downlink Shared Channels, PDSCHs, and a second set of HARQ ACK bits being associated with one or more activated Semi-Persistent Scheduling, SPS, PDSCHs each with an SPS configuration index; and
ordering the second set of HARQ ACK bits according to the SPS configuration index of the one or more activated SPS PDSCHs;
wherein the second set of HARQ ACK bits is appended to the first set of HARQ ACK bits;
wherein the ordering the second set of HARQ ACK bits according to the SPS configuration index further comprises ordering the second set of HARQ ACK bits in increasing order of first the SPS configuration index and then the serving cell index.

2. The method of claim 1 further comprising:
sending the dynamic HARQ codebook to a network node in a uplink channel in an uplink slot or sub-slot.

3. The method of claim 2, where the uplink channel is a Physical Uplink Control Channel, PUCCH.

4. The method of claim 1 further comprising:
receiving, from the network node, a configuration of one or more downlink SPS PDSCHs, each with the SPS configuration index, for each of one or more serving cells each with a cell index.

5. The method of claim 1 further comprising receiving one or more activated downlink SPS PDSCHs from the one or more serving cells.

6. The method of claim 1 further comprising:
sending, to the network node, HARQ ACK feedback associated with the SPS PDSCHs.

7. The method of claim 1 wherein, for SPS PDSCH transmission over multiple Transmission Reception Points, TRPs, HARQ ACK bits in a semi-static HARQ codebook are ordered according to one of the group consisting of: TRP first and then serving cells; and the serving cell first and then the TRPs.

8. The method of claim 1 wherein the network node is a base station.

9. A method performed by a network node, comprising:
configuring a User Equipment, UE, with one or more serving cells, each with one or more Semi-Persistent Scheduling, SPS, Physical Downlink Shared Channels, PDSCHs;
activating and transmitting the one or more of SPS PDSCHs;
transmitting one or more dynamically scheduled PDSCHs; and
receiving in a uplink slot a Hybrid Automatic Repeat Request, HARQ, Acknowledgement, ACK, codebook comprising a first set of HARQ ACK bits associated with the one or more dynamically scheduled PDSCHs and a second set of HARQ ACK bits associated with the one or more SPS PDSCHs;
wherein the second set of HARQ ACK bits is appended to the first set of HARQ ACK bits;
wherein the ordering the second set of HARQ ACK bits according to the SPS configuration index further comprises ordering the second set of HARQ ACK bits in increasing order of first the SPS configuration index and then the serving cell index.

10. A wireless device comprising: one or more processors; and memory storing instructions executable by the one or more processors, whereby the wireless device is operable to:
construct a dynamic Hybrid Automatic Repeat Request, HARQ, codebook with a first set of HARQ Acknowledgement, ACK, bits being associated with dynamically scheduled Physical Downlink Shared Channels, PDSCHs, and a second set of HARQ ACK bits being associated with Semi-Persistent Scheduling, SPS, PDSCHs each with an SPS configuration index; and
order the second set of HARQ ACK bits according to the SPS configuration index of the one or more activated SPS PDSCHs;
wherein the second set of HARQ ACK bits is appended to the first set of HARQ ACK bits;
wherein the ordering the second set of HARQ ACK bits according to the SPS configuration index further comprises ordering the second set of HARQ ACK bits in increasing order of first the SPS configuration index and then the serving cell index.

* * * * *